(12) United States Patent
Chen et al.

(10) Patent No.: US 7,039,028 B2
(45) Date of Patent: May 2, 2006

(54) PACKET DISTRIBUTION AND SELECTION IN SOFT HANDOFF FOR IP-BASED BASE STATIONS AMONG MULTIPLE SUBNETS

(75) Inventors: Jyh-Cheng Chen, Hsinchu (TW); Tao Zhang, Fort Lee, NJ (US)

(73) Assignees: Telcordia Technologies, Inc., Piscataway, NJ (US); Toshiba America Research, Inc., Piscataway, NJ (US)

( * ) Notice: Subject to any disclaimer, the term of this patent is extended or adjusted under 35 U.S.C. 154(b) by 966 days.

(21) Appl. No.: 09/975,912

(22) Filed: Oct. 12, 2001

(65) Prior Publication Data

US 2002/0191561 A1    Dec. 19, 2002

Related U.S. Application Data

(60) Provisional application No. 60/281,308, filed on Apr. 4, 2001.

(51) Int. Cl.
*H04Q 7/00* (2006.01)
*H04Q 7/20* (2006.01)
*H04L 12/66* (2006.01)

(52) U.S. Cl. .................... 370/331; 370/329; 370/352; 455/442

(58) Field of Classification Search ............... 370/331, 370/329, 352, 338, 349, 401, 310.2, 328, 370/332, 428; 455/442, 445, 422
See application file for complete search history.

(56) References Cited

U.S. PATENT DOCUMENTS 6,628,943 B1 *   9/2003   Agrawal et al. ......... 455/432.1

OTHER PUBLICATIONS

V.K. Garg, "IS-95 CDMA and cdma 2000:Cellular/PCS Systems Implementation", pp. 60-62, published by Prentice-Hall, 2000.

* cited by examiner

*Primary Examiner*—Afsar Qureshi
(74) *Attorney, Agent, or Firm*—Joseph Giordano; James W. Falk

(57) ABSTRACT

A technique for assigning an address ("shadow address") to a mobile station that is compatible with the layer-2 address on the wireline network which serves the mobile station. The shadow address is then used as a wireline identifier for the destination address for frames ultimately destined for the mobile station. The shadow address is stored in a watch list for serving base stations, and any base station receiving a frame with a shadow address in its watch list process the frame to forward it the to mobile station. In this way, the shadow address facilitates carrying out soft handoff and smooth handoff.

14 Claims, 17 Drawing Sheets

US 7,039,028 B2

PACKET DISTRIBUTION AND SELECTION IN SOFT HANDOFF FOR IP-BASED BASE STATIONS AMONG MULTIPLE SUBNETS

CROSS REFERENCE TO RELATED APPLICATIONS

This application is a non-provisional application of provisional application Ser. No. 60/281,308 filed Apr. 4, 2001. It is also related to Agrawal-Chen-Zhang application Ser. No. 09/975,801, filed Oct. 12, 2001; Agrawal-Chen-Zhang application Ser. No. 09/975,890, filed Oct. 12, 2001; Chen-Zhang application Ser. No. 09/975,910, filed Oct. 12, 2001; and Agrawal-Chen-Zhang application Ser. No. 09/976,166, filed Oct. 12, 2001.

BACKGROUND OF THE DISCLOSURE

1. Field of the Invention

This invention relates generally to a wireless-to-wireline and wireless-to-wireless communication system that is composed of wireless access networks interconnected via a wireline IP (Internet Protocol) network, and, more particularly, to methodologies and concomitant circuitry for effecting soft handoff in the wireless portion of the system.

2. Description of the Background Art

Today, many different wireless systems exist, ranging from indoor wireless LANs (Local Area Networks) to outdoor cellular systems. Generally, the numerous wireless systems are not compatible with each other, making it difficult to roam from one system to another. Although there have been attempts to unify third-generation wireless systems, incompatible systems are expected to co-exist in the future. Furthermore, wireless LANs and cellular wireless systems are being developed independently, and such systems are also evolving independently. So far, no wireless technology has emerged as a common and long-term universal solution.

IP (Internet Protocol), which is already a universal network-layer protocol for packet networks, is rapidly becoming a promising universal network-layer protocol for wireless systems. An IP terminal, with multiple radio interfaces, can roam between different wireless systems if they all support IP as a common network layer. Unlike today's wireless systems in which Radio Access Networks (RANs) are mostly proprietary, IP provides an open interface and promotes an open market. IP will also enable widely adopted and rapidly growing IP-based applications to run over wireless networks. Moreover, distributed, autonomous IP-based wireless base stations have the potential of making the wireless systems more robust, scalable, and cost effective.

There are, however, many challenges to realizing distributed all-IP wireless networks. For the sake of specificity in discussing these challenges as well as pointing out problem areas, reference is made to FIG. 1. The depiction of network 100 in FIG. 1 illustrates an exemplary configuration of a network that uses IP-based wireless base stations (designated iBSs). The coverage area of the wireless network is defined by a multiplicity of cells (e.g., cells 101, 102, 103). The geographical area covered by each wireless base station is referred to as a cell (e.g., iBS 111 serves cell 101, and so forth). When mobile station 104 moves from one cell (e.g., cell 101 originally) into the overlapping regions (e.g., overlap of cells 101 and 102) of the coverage areas of multiple base stations, base station 111 may perform a "handoff" of mobile station 104 to base station 112. Handoff is a process whereby a mobile station communicating with one wireless base station is switched to another base station during a session. Overlap regions 117 and 118 are coverage areas where handoff is effected. For example, as mobile station 104 moves into region 117 while roaming in cell 101, the radio signal strength from iBS 2 (depicted by reference numeral 115) may be greater than the radio signal strength (114) from iBS 1, so handoff is warranted to maintain the quality of the established session.

Among the key challenges in a distributed all-IP wireless network is how to support "soft handoff". As suggested above, handoff is the process that allows a mobile station's session-in-progress to continue without interruption when a mobile station (MS) moves from one wireless cell to another. Soft handoff is a form of handoff whereby a mobile station can start communication with the target base stations without interrupting the communication with the serving base station. Thus, soft handoff allows a MS to communicate with multiple base stations (BSs) simultaneously. In particular, soft handoff has been shown to be an effective way for increasing the capacity, reliability, and coverage range of CDMA-based wireless networks. Soft handoff also provides more time for carrying out the handoff procedure.

Soft handoff in a CDMA-based wireless system is the focus of the subject matter of the present invention. In Code Division Multiple Access (CDMA) radio systems, a narrow-band user message signal is multiplied by a very large bandwidth signal called the spreading signal. The spreading signal is a pseudo-noise code sequence that has a communication signal rate which is orders of magnitudes greater than the data rate of the user message signal. All users in a CDMA system may transmit simultaneously. Each user has its own pseudorandom code for coding its own message signal—each code is approximately orthogonal to all other codes. A receiver is assigned a code to detect a desired user message signal, and performs a time correlation operation to detect only the specific assigned code. All other codes appear as noise due to de-correlation. CDMA is effective in wireless systems because a receiver can be assigned a multiplicity of codes to detect message signals from a corresponding multiplicity of transmitters, thereby engendering the soft handoff process.

An IP router is an IP network device that runs IP layer routing protocol (e.g., OSPF and BGP) and forwards IP packets. The running of a routing protocol decides the "routing policy", and the forwarding of IP packets realizes the "routing mechanism". IP packets arriving from the wireline IP network (121) at a given base station (e.g., iBS 111 over wireline path 122 or iBS 112 over path 123) can be routed by the routing mechanism of the base station to mobile station 104 (or other appropriate wireline devices that connect directly to the base station).

Today, the only known approach to designing an IP-based base station is to add (or connect) radio transmission and receiving equipment directly onto an IP router (131). Such a design, however, has a potentially serious shortcoming. In particular, the mobile stations served by different base stations must belong to different IP subnets, that is, the design forces the mobile stations in different cells to be on different IP subnets. (Here, a subnet is used in the sense defined by an IP address, which has the form, for example, "w.x.y.z" (e.g., 129.3.2.14), wherein "w.x" is the network address (129.3), "y" (2) is the subnet address for a device associated with the given network, and "z" (14) is the host address for a device associated with the given network/subnet, such as a mobile terminal or a base station. In terms of FIG. 1, iBS 1 may be assigned the subnet address 2, whereas mobile station 104 may have the host address 14.)

Suppose, for the sake of argument, that a mobile station is served by two base stations belonging to the same IP subnet S. Then, both iBSs (IP routers) will advertise to other routers in the overall network that they can reach all the hosts on subnet S. However, each iBS can only reach a subset of the hosts on subnet S (i.e., the set of hosts being currently served by the base station). This means that other routers will not be able to determine which base station should receive a packet destined for a host on subnet S. In other words, packets may be delivered to the wrong base station and consequently cannot reach the destined host.

The fact that mobile stations (MSs) in different cells belong to different IP subnets suggests that an MS may have to change its IP address every time it moves into a new cell. Changing IP address usually takes a long time using today's methods for dynamic IP address assignment (e.g., the Dynamic Host Configuration Protocol or DHCP). When certain IP-layer mobility management mechanisms are used (e.g., SIP-based mobility management), a change of IP address can also mean that the old session may need to be modified, or new SIP sessions may have to be established.

Having to change IP addresses when moving from one cell to another also makes soft handoff more difficult to implement. For example, if an MS has to use different IP addresses to receive IP packets from different iBSs, IP packets coming to the MS from different iBSs will not be identical because they carry different IP destination addresses. Consequently, copies of the same packets from different base stations may not be correctly combined by the MS's radio system.

Recently, methods (e.g., HAWAII, Cellular IP) have been proposed to enable MSs to move within a domain of multiple IP subnets without having to change their IP addresses. These methods, however, typically require complex IP-layer signaling and significant changes to the IP routers in the domain. Furthermore, these methods have not considered how to solve the data content synchronization problem.

From another viewpoint, in today's circuit-switched CDMA networks such as IS-95, a centralized Selection and Distribution Unit (SDU) is responsible for data distribution in the forward direction (from BS to MS). The SDU creates and distributes multiple streams of the same data over layer-2 circuits to multiple BSs that in turn relay the data to the MS. The MS's radio system (typically working below the IP layer) collaborates with the BSs to synchronize the radio channel frames and combine the radio signals received from different BSs to generate a single final copy of received data. The SDU helps ensure data content synchronization by ensuring that the matching layer-2 frames sent to different base stations contain copies of the same data. In the reverse direction (from MS to BS), the MS ensures that the matching layer-2 frames sent to different BSs contain copies of the same data. The SDU then selects one of the frames received from different base stations as the final copy of the data.

Accordingly, as evidenced by the foregoing discussion, achieving soft handoff among distributed iBSs introduces several new technical problems that cannot be solved readily by the mechanisms developed for today's centralized circuit-switched wireless networks.

One problem already alluded to is loss of data content synchronization. With distributed iBSs, centralized control entities, such as the SDU in circuit switched wireless networks, will no longer exist. Consequently, even though the CDMA radio system is capable of synchronizing the link and physical layer frames on the radio channel, it cannot, on its own, guarantee that the matching frames from different base stations will carry copies of the same data. For example, IP packets can be lost on their way to the MS, creating random gaps in the packet streams received by the MS from different iBSs. Furthermore, copies of the same data may arrive at the MS at different times due to the random delays suffered by the packets. Random gaps and delays can lead to a loss of data content synchronization. Suppose that packet X is lost at iBS 1 (due to, for example, buffer overflow) but is not lost at iBS 2. Then, another totally unrelated packet Y from iBS 1 and packet X from iBS 2 may arrive at the MS at the same time and the MS's radio system will not be able to tell that they are not copies of the same data and will hence erroneously combine X with Y.

Another problem is how to support soft handoff, which requires a mobile station to receive identical copies of the same data from multiple base stations simultaneously. When the mobile stations served by different base stations belong to different IP subnets, complex IP-layer signaling capabilities (e.g., IP multicast) have conventionally be required to direct copies of the same IP packets via multiple base stations to the mobile station. Furthermore, copies of the same IP packet arriving from different base stations to the mobile station will not be identical because these packets will carry different destination IP addresses. This makes it impossible for the mobile station's radio system to combine the signals from different base stations into a single copy of data.

The art is devoid of a methodology and concomitant systems that effect soft handoff in an all-IP wireless network that uses autonomous iBSs in a configuration having the following characteristics that differentiate the configuration from existing wireless networks: (a) the iBSs use IP protocols for both signaling and transport of user traffic. For example, they may route/forward IP packets based on information carried in the IP headers, perform IP-layer signaling, mobility management and Quality of Service (QoS) management functions; (b) the iBSs function autonomously. There is no centralized signaling and control over the behaviors of the iBSs; (c) the iBSs are interconnected via an IP network which could have arbitrary network topology such as bus, ring, star, tree, etc.; and (d) the cells (a cell is a geographical radio coverage area of a BS) can be arranged in any arbitrary configuration.

SUMMARY OF THE INVENTION

These shortcomings and other limitations and deficiencies are obviated, in accordance with the present invention, by assigning an alias or shadow address to a mobile station that is compatible with the link layer address of the wireline subnet which delivers packets to the mobile station via base stations connected to the wireline subnet, storing the shadow address in the base stations that serve the mobile station during soft handoff, and using the shadow address of the mobile station for packets communicated to the mobile station via the base stations from a sending device coupled to the subnet.

Broadly, in accordance with a method aspect of the present invention, a method for carrying out soft handoff of a mobile station from a first base station served by a first wireline subnet to a second base station served by a second wireline subnet, wherein each subnet has a link layer different than the link layer of the wireless network serving the mobile station and the mobile station has initially a first IP address compatible with the first wireline subnet and wherein the first base station is served by a nearest router, includes: (a) storing of the first IP address and a shadow address in the nearest router, the shadow address corresponding to the mobile station and having a format compatible with the link layer of the first wireline subnet; (b) assigning a second IP address to the mobile station compatible with the second wireline subnet; (c) communicating the second IP address from the mobile station to nearest router via the first base station; and (d) transmitting a frame containing the packet as conveyed by the sending device from the nearest router over the first wireline subnet to the first base station as determined by the shadow address and over the second wireline subnet to the second base station based upon the second IP address.

Broadly, in accordance with a system aspect of the present invention, a system for carrying out soft handoff of a mobile station from a first base station served by a first wireline subnet to a second base station served by a second wireline subnet, wherein each subnet has a link layer different than the link layer of the wireless network serving the mobile station and the mobile station has initially a first IP address compatible with the first wireline subnet, and wherein the first base station is served by a nearest router, includes: (a) a storage device for storing the IP address and a shadow address of the first base station in the nearest router, the shadow address corresponding to the mobile station and having a format compatible with the link layer of the first wireline subnet; (b) a processor for assigning a second IP address to the mobile station compatible with the second wireline subnet; (c) a sending device for communicating the second IP address from the mobile station to nearest router via the first base station; and (d) a transmitter for transmitting a frame containing the packet as conveyed by the sending device from the nearest router over the first wireline subnet to the first base station as determined by the shadow address and over the second wireline subnet to the second base station based upon the second IP address.

BRIEF DESCRIPTION OF THE DRAWING

The teachings of the present invention can be readily understood by considering the following detailed description in conjunction with the accompanying drawings, in which.

DETAILED DESCRIPTION

1. Soft Handoff Within a Subnet 1.1. "Shadow" Address

Figure 1:
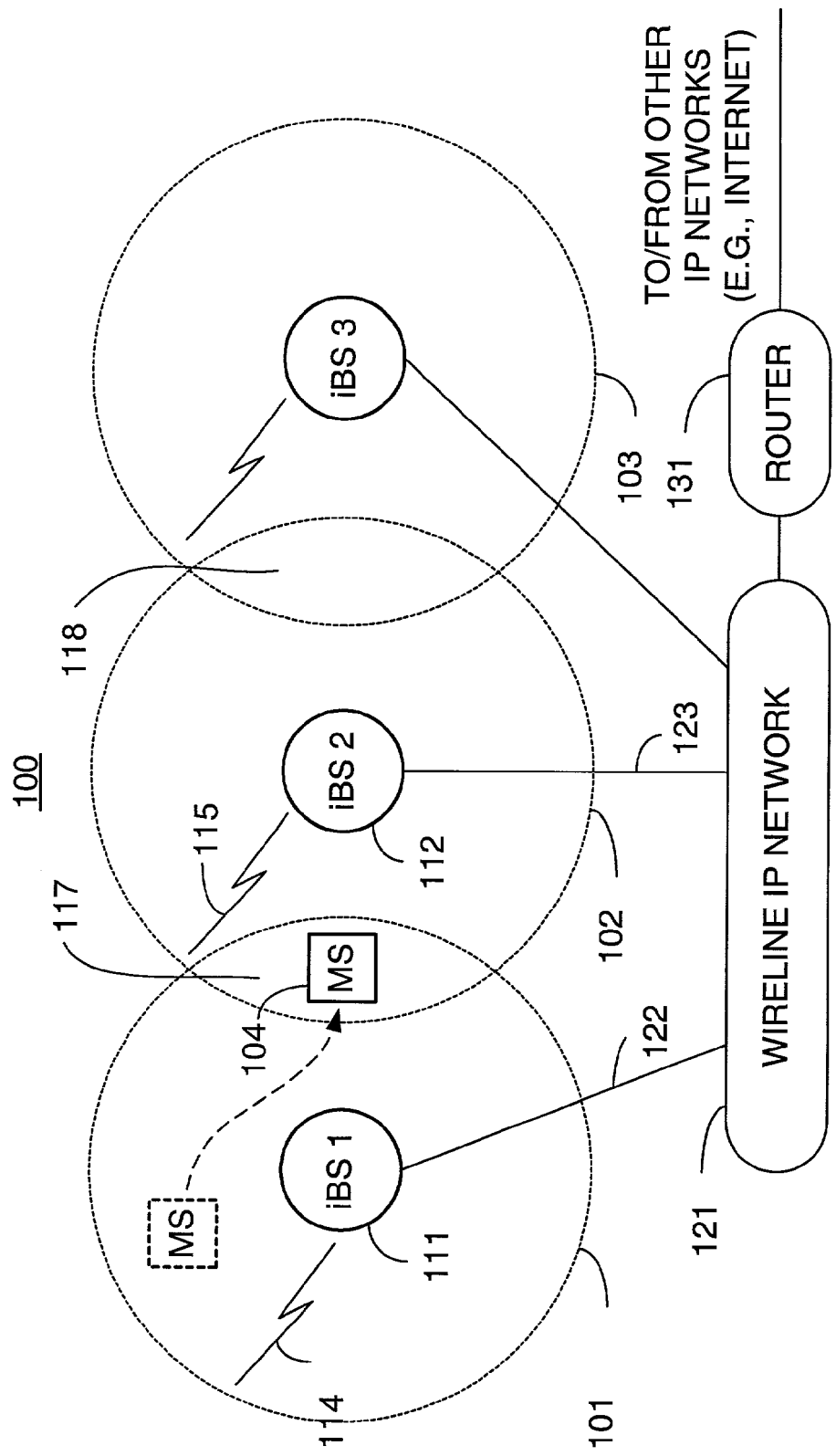
FIG. 1 depicts a wireline-wireless system composed of autonomous base stations serving mobile stations.
Figure 2:
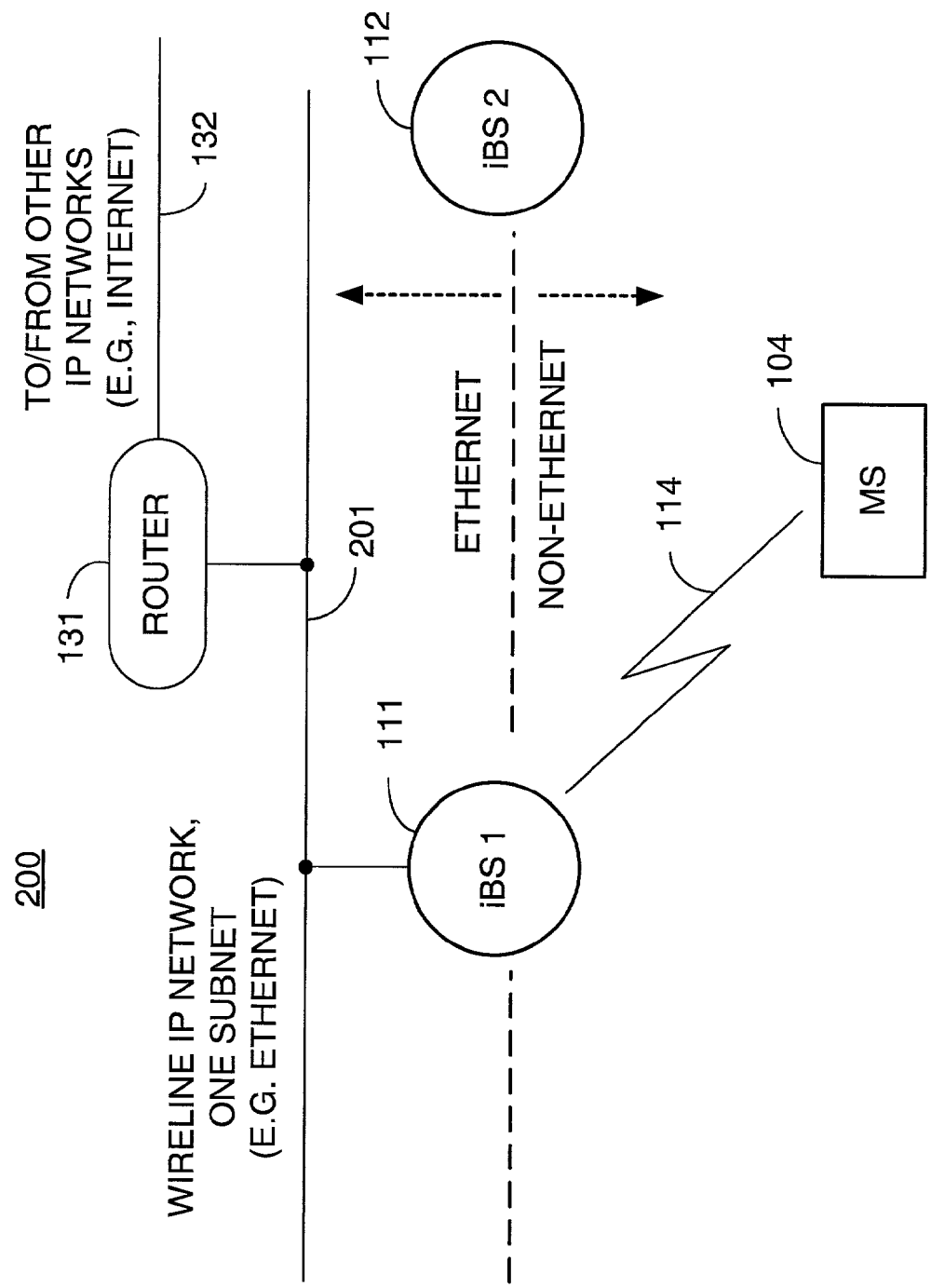
FIG. 2 depicts a system composed of both wireline and wireless networks wherein base stations on a subnet serve mobile stations using their shadow addresses.

As illustrated by system 200 in FIG. 2, which is a recast version of system 100 of FIG. 1 for purposes of highlighting the principles of the present invention, on one side of iBS 1 and iBS 2 (111 and 112, respectively) is wireline IP network 201. Wireline IP network 201 serves as one subnet used to interconnect iBS 1 and iBS 2 with router 131. For sake of specificity, but without loss of generality, wireline IP network 201 is presumed to be an Ethernet. Router 131 is also coupled to other IP networks, such as the Internet, via another port to deliver packets to and from wireline IP network 201 over path 132. On the other side of iBS 1 and iBS 2 is a wireless network represented, in part, by wireless radio path 114 linking MS 104 with iBS 1. Thus, there is a clear demarcation between the wireline and wireless aspects of system 200, which is depicted in FIG. 2 by the Ethernet and non-Ethernet portions of system 200.

It is also readily appreciated that, whereas the sending device was exemplified as being coupled, for example, into wireline network 201 from a device propagating a packet through router 131 of FIG. 2, it is clear that the principles of the present invention also apply for a wireless sending device that use a link layer addressing scheme which is compatible with the link layer of the subnet. Accordingly, both cases are covered in the description by stating that the sending device is "coupled to" the wireline subnet, thereby covering (but not being limited to) both direct connection or wireless coupling to the subnet.

To understand the importance of the separation between the wireline and wireless sides of the base stations, consider the ramifications of a single IP subnet serving multiple iBSs, as illustrated in FIG. 2. Generically, when a device (e.g., router, iBS, or host) on the wireline IP subnet wants to send an IP packet to a mobile station, the sending device, by convention, normally determines the layer-2 address that should be used to send the IP packet over the wireline subnet to the base station handling the mobile station. But, when the mobile station is using a different layer-2 protocol that is incompatible with the layer-2 protocol used on the wireline subnet, the sending device cannot use the layer-2 address of the mobile to send IP packets over the wireline subnet. This will be the case, for example, when the wireless network uses CDMA technologies that have a different format for the layer-2 address than that on the wireline subnet (such as Ethernet).

To circumvent this difficulty and to ensure that a sending device can direct the packet to the right base station, consider first deploying the wireline layer-2 address (e.g., MAC address in the case of Ethernet) of the destination base station as an alias for the mobile station and, accordingly, the sending device would forward the packet to the destination base station as the proxy for the mobile station. Then, the base station can use, in turn, IP-layer and/or other layer information to determine to which mobile station the packet should be sent. This is only part of the solution, however, because in this scenario only a single base station serves the mobile station. To carry out soft handoff, it is necessary that multiple base stations relay copies of the same packet to the mobile station which would be difficult in the above scenario, that is, sending a packet to only a single base station's wireline layer 2 address.

Consider now an extension to the above approach whereby a so-called "shadow address" is utilized. With the shadow address approach, besides the unique wireless layer-2 address normally allocated to each mobile station, a unique wireline layer-2 address is also assigned to the mobile station. Since the mobile station may be using a different layer 2 than the wireline network, the wireline layer-2 address assigned to the mobile station may have no meaning to the mobile station and cannot be used by the mobile station for any other purposes. However, the wireline layer-2 address assigned to the mobile station can be advantageously used by a base station to determine which layer-2 frame arriving from the wireline network should be accepted by the base station and, if accepted, to pass the IP packet contained in the layer-2 frame to the IP layer in the base station for further processing. The IP layer of the base station then uses the information in the IP header of the incoming IP packet to determine which radio interface on the base station the packet should be sent to. In essence, the wireline layer-2 address assigned to a mobile station can be viewed as a "shadow" that the mobile station casts on the wireline layer 2. For this reason, the wireline layer-2 address assigned to a mobile station will be referred to as the shadow wireline layer-2 address of the mobile station, or "shadow address" for short.

Each base station maintains a "watch list" similar to that in Table 1. The field denoted "MS's IP Address" contains the IP address which is assigned to the mobile station in the subnet. The field denoted "MS's Shadow Address" is the shadow wireline layer-2 address. Table 1 shows the address in the format of the IEEE 802.3 MAC address which is the most popular link layer or layer 2 for a LAN (layer 2 and link layer are used interchangeably in the sequel without loss of generality). The field denoted "MS's Link Layer Address" is the real wireless link layer address of the mobile station. It could be the link layer address for any one of many different standards, such as cdma2000, WCDMA, Bluetooth, and so forth.

TABLE 1

| MS's IP Address | MS's Shadow Address | MS's Link Layer Address |
|---|---|---|
| 128.33.22.121 | 00:60:1D:03:E7:E1 | xxxxxx |
| 129.55.32.131 | E1:E7:03:1D:60:01 | yyyyyy |
| . . . | . . . | . . . |
| . . . | . . . | . . . |

The shadow address may be assigned to a mobile station dynamically when the mobile station powers up and accesses the wireless network for the first time. Or, it can be configured in the mobile station prior to the first time it is powered, that is, each mobile station may be assigned a shadow address in addition to a real link layer address. Shadow address assignment will be discussed in more detail below when flow diagrams are presented.

1.2. Use of Shadow Address by a Base Station to Relay a Packet

Each base station uses the shadow address created for each mobile station to help relay an IP packet between the wireless and the wireline networks. The wireline interface of each base station examines the layer-2 destination address of each layer-2 frame arriving from the wireline network. If the destination layer-2 address matches any shadow address in its watch list, the base station accepts the frame, takes the IP packet out from the frame, and passes the IP packet to the base station's IP layer for further processing. For ease of discussion, the term "matching frames" is used to refer to a layer-2 frame whose destination layer-2 address matches one of the shadow addresses currently in the base station's watch list. If the IP packet is destined for one of the mobile stations currently served by the base station, the IP layer forwards the IP packet to the destination mobile station. If the IP packet is not destined for either any mobile station currently being served by the base station or the base station itself, the IP layer may ignore the packet.

When any device on the local wireline IP subnet wants to send a first IP packet to a mobile station, the sending device must first determine the shadow wireline layer-2 address of the destination mobile station. The sending device can do this, for example, by using the well-known, conventional Address Resolution Protocol (ARP) designed for the wireline IP network. In particular, the sending device will broadcast an ARP REQUEST packet over the local IP subnet. The base station that has the shadow layer-2 address of the destination mobile station in its watch list will respond to the ARP REQUEST with the shadow layer-2 address of the destination mobile station. The shadow wireline layer-2 address will then be used by the sending device on the local IP wireline network to send a packet to the mobile station via the base station responding to the ARP REQUEST. In addition, when the shadow layer-2 address of a destination mobile station is in the watch list of multiple base stations, all of the base stations may respond to the ARP REQUEST. These responses will contain the same shadow address of the destination mobile station. The import of multiple base stations having the mobile station on their watch lists will be elaborated upon shortly.

Figure 3A:
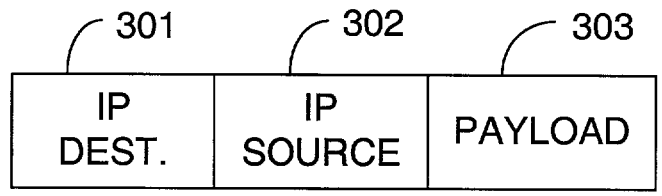
FIGS. 3A and 3B depict a generic IP packet and an IP packet having a mobile station as a destination device, respectively.
Figure 3B:
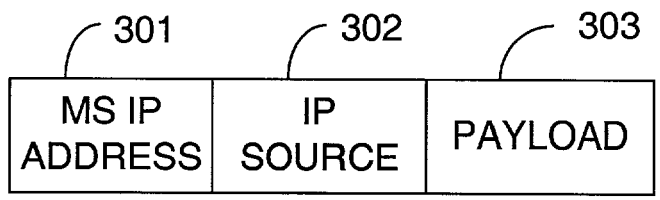
Figure 3C:
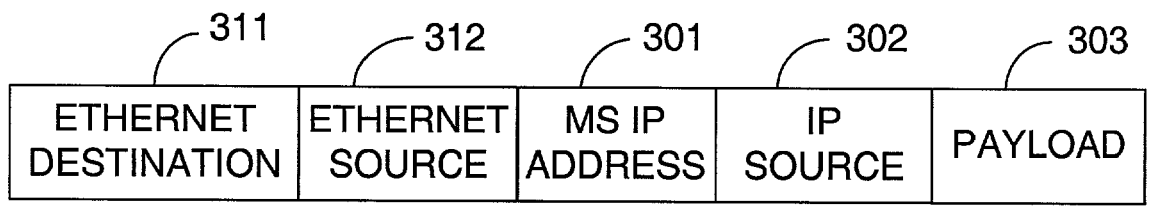
FIGS. 3C and 3D depict a generic Ethernet frame and an Ethernet frame having the shadow address of the mobile station as an Ethernet destination address, respectively.
Figure 3D:
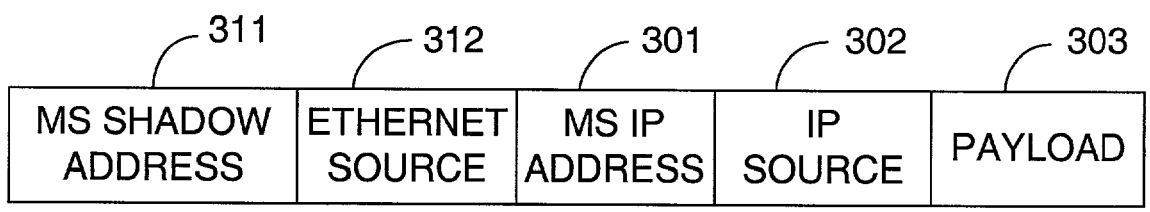

To illustrate the foregoing discussion concretely, consider the IP packet of FIG. 3A composed generally an IP payload 303 and an IP header which is composed of, among other information, the IP destination address 301 and IP source address 302. In addition, suppose the packet is originated by an IP sending device coupled to path 132 of FIG. 2, and the packet is destined for mobile station 104 served by iBS 1. Thus, the IP destination address is the IP address of the mobile station 104—this particular packet is shown in FIG. 3B. In order for the sending device to decide how to encapsulate the packet at layer 2, the sending device propagates an ARP REQUEST asking for the layer-2 address that corresponds to the IP address of the mobile station (e.g. 128.33.22.121 in Table 1) over wireline IP network 201, which again for concreteness, is presumed to be an Ethernet. The ARP REQUEST reaches iBS 1, and iBS 1 notes that this IP address is in its watch list and it is associated with mobile station 104. In response to the ARP REQUEST, iBS 1 sends the shadow address (00:60:1D:03:E7:E1) of mobile station 104 to the sending device. The shadow address, which is an actual wireline layer-2 address for wireline 201, can then be used by the sending device to encapsulate the packet into an Ethernet frame. A generic Ethernet frame is shown in FIG. 3C and has, besides the packet fields, the Ethernet destination address 311 and the Ethernet source address 312. In FIG. 3D, the actual Ethernet frame containing the given packet is shown; the Ethernet destination address is the shadow address of mobile station 104.

As the Ethernet frame of FIG. 3D propagates over wireline 201, the frame is detected by iBS 1. Then iBS 1, via its watch list, recognizes the shadow address in the Ethernet frame as one being served by iBS 1. Accordingly, iBS 1 handles the Ethernet frame by stripping off the layer-2 information, including fields 311 and 312, and passes the IP packet to the IP layer processing of iBS 1. Processing at the IP layer will be discussed in more detail in the sequel.

The layer-2 frames going out from a base station to the wireline IP network may set its source layer-2 address to the shadow layer-2 address of the source mobile station (the mobile station that originated this packet) or the layer-2 address of the base station.

Figure 4:
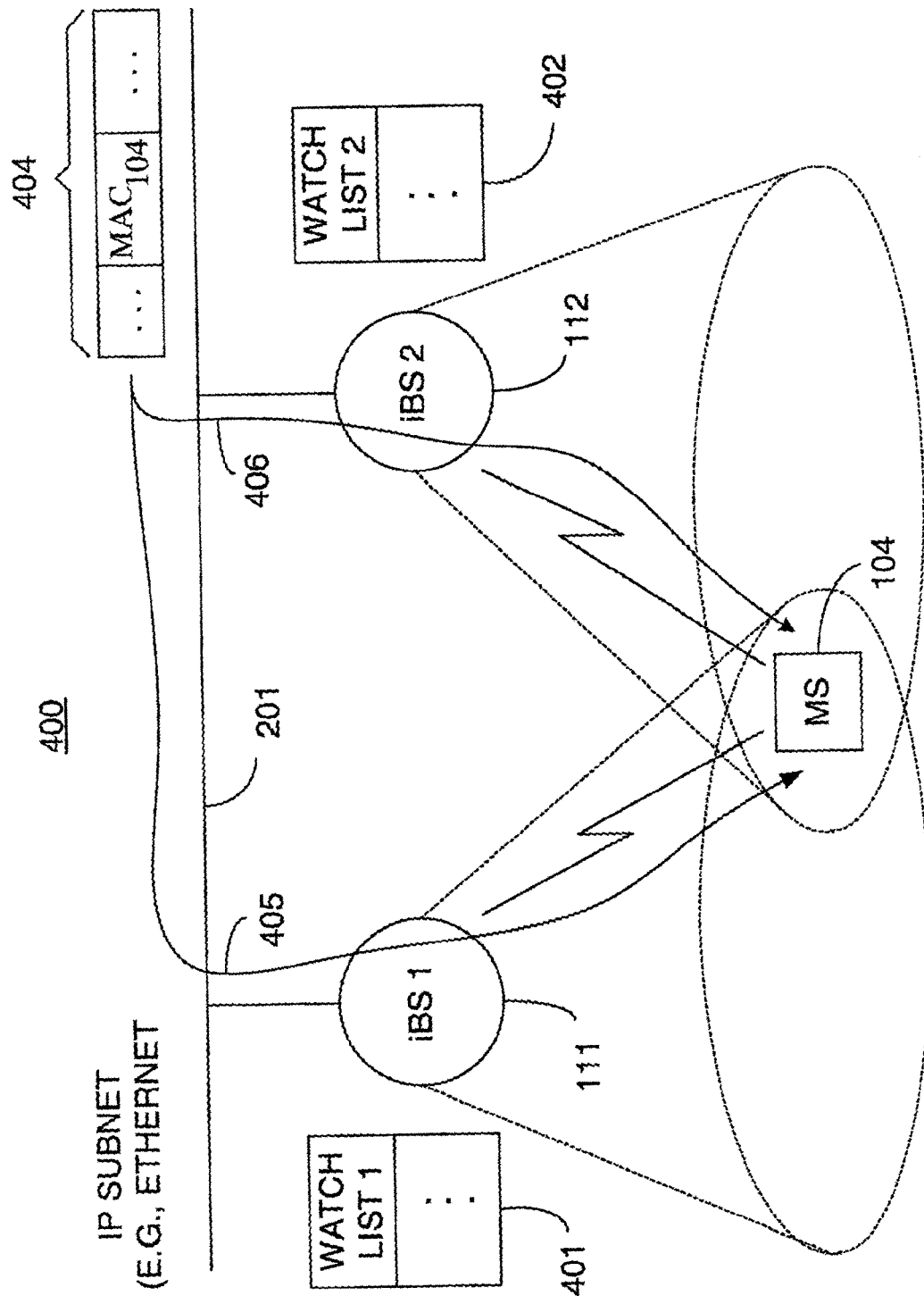
FIG. 4 depicts a system composed of both wireline and wireless networks wherein a multiplicity of base stations on the same subnet send multiple copies of a packet to a roaming mobile station to carry out soft handoff.

1.3. Base Stations Use of Shadow Addresses to Simultaneously Relay Copies of the Same Packet to a Mobile in Soft Handoff State Arrangement 400 of FIG. 4 illustrates how multiple base stations can use the shadow layer-2 address of a mobile station to simultaneously relay copies of the same IP packet to the mobile station to carry out soft handoff.

Suppose initially that mobile station 104 is registered with iBS 1 (111), and that mobile station (MS) 104 has the parameters listed in row 1 of Table 1 above, that is, the IP address of the MS 104 is 128.33.22.121 and the shadow address is 00:60:1D:03:E7:E1 (which will be called $MAC_{104}$ for short). Watch list 1 (401) in iBS 1 is, for illustrative purposes, that exemplified by Table 1; accordingly, the shadow address of MS 104 is in watch list 401. When mobile station 104 first starts communication with new base station iBS 2 (112) as it roams into the overlap of the cellular regions, iBS 2 will insert $MAC_{104}$ into its watch list, shown as watch list 2 (402). Many ways exist for the new base station to learn the shadow address of the MS and will be discussed in greater detail later. Exemplary contents for watch list 402 are listed in Table 2 below; the third row contains information about MS 104. From this point in time, iBS 2 will accept a layer-2 frame coming from the wireline network that carries $MAC_{104}$ as the destination layer-2 address and will send the packet carried in this frame to the IP layer on iBS 2 for further processing.

TABLE 2

| MS's IP Address | MS's Shadow Address | MS's Link Layer Address |
|---|---|---|
| ... | ... | ... |
| 128.44.12.111 | F1:F7:04:2D:70:03 | zzzzzzzzz |
| 128.33.22.121 | 00:60:1D:03:E7:E1 | xxxxxx |
| ... | ... | ... |

Since both base stations iBS 1 and iBS 2 now have $MAC_{104}$ in their watch lists, they will both accept layer-2 frames destined for $MAC_{104}$ and forward the IP packet carried in these frames to the mobile station simultaneously, as exemplified by path 405 and path 406, respectively. Path 405 delivers Ethernet frame 404 containing $MAC_{104}$ and an embedded IP packet over IP subnet 201 to iBS 1 and, in turn, over a radio channel to MS 104. Similarly, path 406 delivers IP frame 404 containing $MAC_{104}$ and the embedded IP packet over IP subnet 201 to iBS 2 and, in turn, over a radio channel to MS 104.

Figure 5:
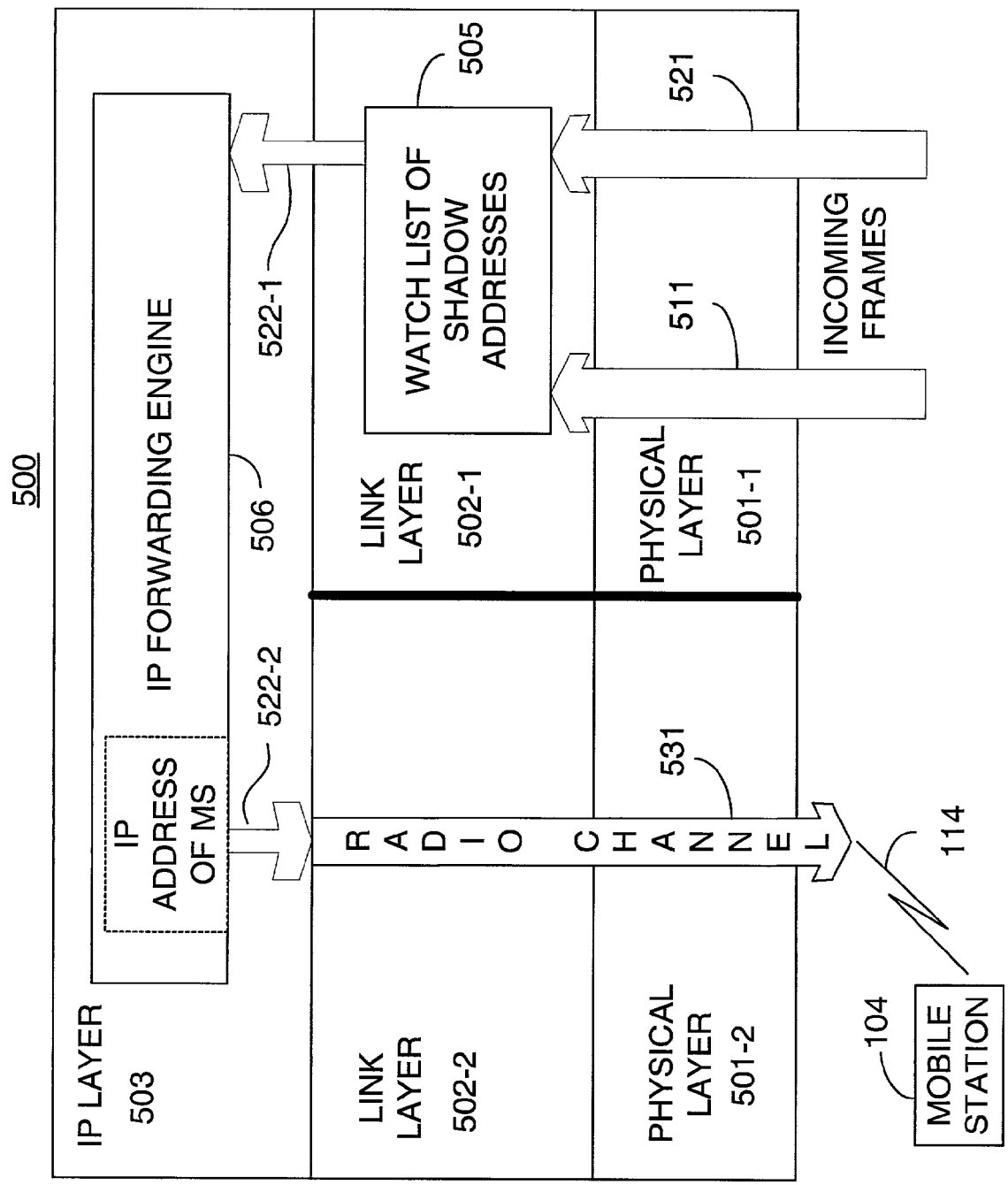
FIG. 5 depicts base station processing in terms of conventional physical layer, link layer, and IP layer protocol stacks while using shadow addresses of mobile stations.

FIG. 5 illustrates the arrangement 500 of a base station in terms of conventional protocol stacks, namely, physical layers 501-1 and 501-2, link or layer 2 layers 502-1 and 502-2 (e.g., receiving frames), and the IP layers 503 (e.g., receiving packets) to process the shadow wireline layer-2 address for a mobile station. Layers 501-1 and 502-1 are associated with the wireline side of the base station, whereas layers 501-2 and 502-2 are associated with the wireless side of the base station. By way of reiteration, the main purpose of shadow addresses is to enable the wireline interface of the base station to accept the layer-2 frames that arrive from wireline networks and are destined for mobile stations served currently by the base station with reference to its watch list. The wireline interface of the base station will monitor all layer-2 frames that come from the wireline network and will accept any layer-2 frame whose destination layer-2 address matches the shadow address of any mobile station currently being served by the base station. As depicted in FIG. 5, there are two incoming frames labeled 511 and 521, respectively. It is presumed that only frame 512 has a layer-2 destination address that is in the watch list (505) for the base station. In effect, the watch list acts as a filter to select only those frames having a destination address which is either the base station layer 2 address or shadow addresses contained in the watch list. Once a layer-2 frame is accepted by the wireline layer 2, the IP packet (522-1) carried in the frame will be extracted and passed to the IP layer forwarding engine 506 in IP layer 503 for any processing (e.g., QoS control) at the IP layer.

In particular, the IP address of the mobile station is known to the base station via, for instance, the contents of watch list exemplified by Table 1. Moreover, the base station utilizes another table that maps radio channels to mobile stations; an illustrative table is shown by Table 3:

TABLE 3

| Radio Channel Number | MS's IP Address | MS's Link Layer Address |
|---|---|---|
| 1 | not assigned | ... |
| 2 | 128.33.22.121 | xxxxxx |
| ... | ... | ... |
| N | 129.55.32.131 | yyyyyy |

The IP address of mobile station 104, as used throughout the discussion, is on the second row of Table 3, namely, 128.33.22.121. Radio channel 2 is presently serving mobile station 104. Outgoing packet 522-2 from the IP forwarding engine, which is the counterpart to incoming packet 522-1 resulting from processing in IP forwarding engine 506, is passed to layer 2 (502-2) for encapsulation. The frame format is that deployed by the radio system, and the destination address is determined from the mobile station's layer-2 address from watch list 505. Finally, the layer 2 radio frame is propagated to mobile station 104 over wireless channel 114.

A base station could also directly use the shadow addresses to determine to which mobile station a layer-2 frame arriving from the wireline network should be sent to and then send the layer-2 frame directly to the outgoing radio channel without IP-layer processing. This process is referred to as layer-2 switching, which means switching layer-2 frames from an incoming layer 2 to an outgoing layer 2 of a base station. In this mode, the base station is essentially functioning as a layer-2 bridge.

Figure 6:
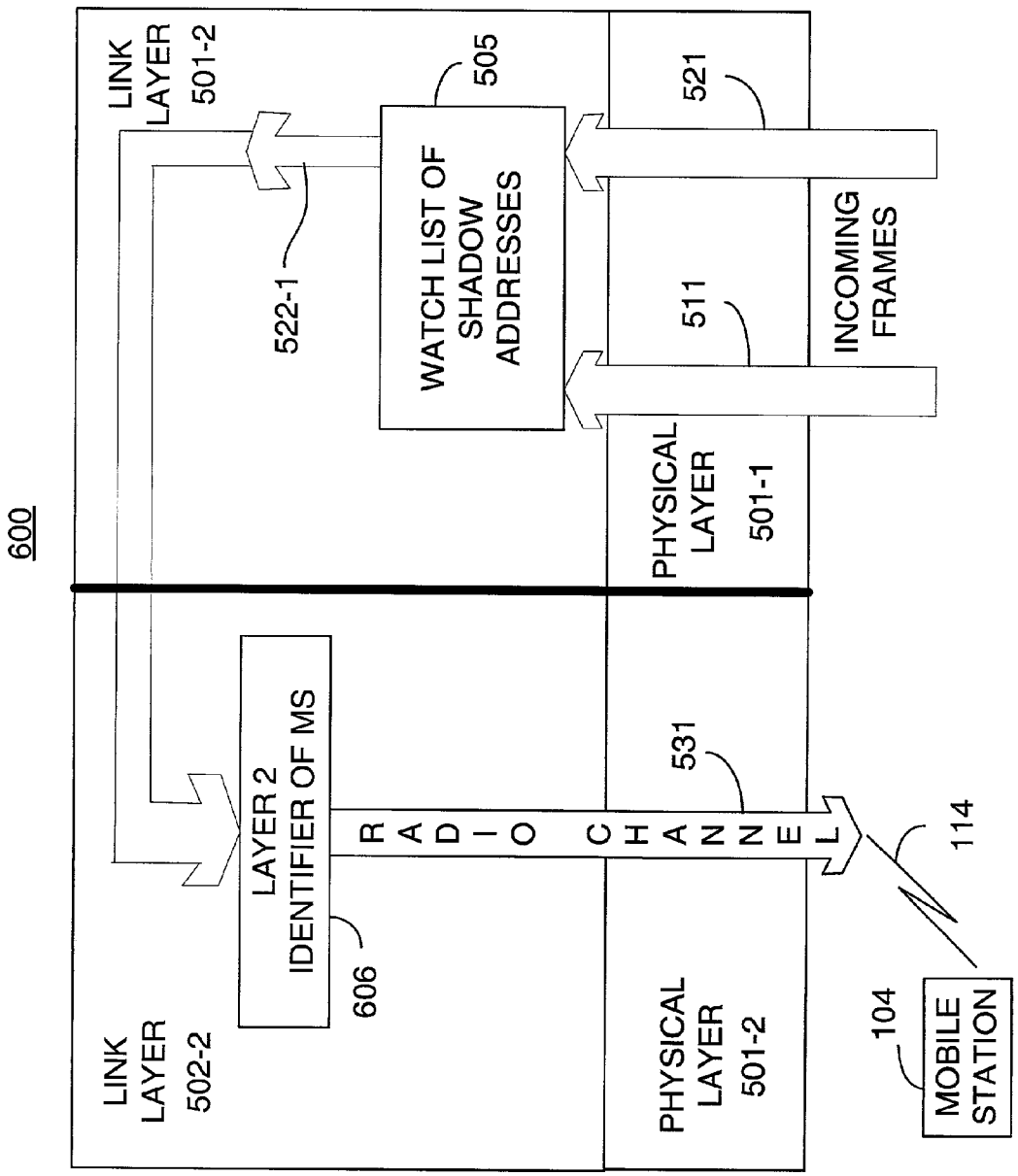
FIG. 6 depicts the arrangement of a base station in terms of only the conventional physical layer and link layer protocol stacks to process shadow addresses of mobile stations.

The arrangement 600 of FIG. 6 depicts this scenario. As in FIG. 5, an incoming frame is passed to layer 2 (501-2) whenever the layer-2 address of the incoming frame is in the watch list. Because the watch list has the necessary information to complete packet forwarding at layer 2, namely, the layer-2 wireline address (e.g., xxxxxx), the IP layer processing can be bypassed if desired. Again, the contents of Table 3 can be use to identify the mobile station by its layer 2 address (606), and encapsulate the frame propagated by radio channel 531 using the layer-2 wireless address (it is clear that a simplified version of Table 3 is possible in this case, wherein only the first and third columns compose the simplified table). Note that the base station switches the payload of the incoming frame (e.g., IP packets in case of IP-based base station) rather than the entire incoming layer-2 frame. This is because wireless and wireline layer-2 protocols used in the network can be completely different and, consequently, the layer-2 header on the wireline network will become useless in the wireless network and vice versa.

Figure 7:
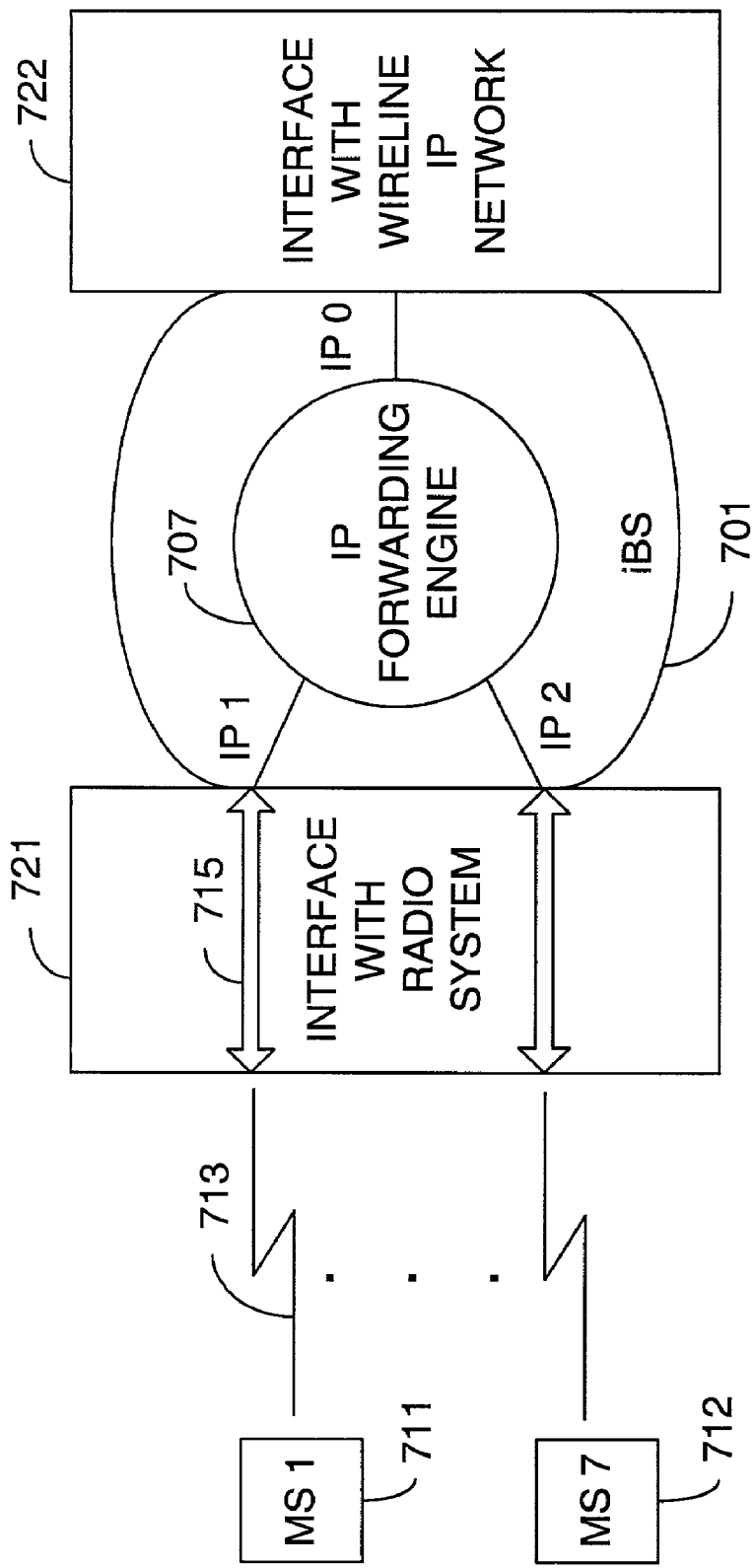
FIG. 7 depicts the processing by a base station that performs the routing mechanism without changing the routing policy fostered by shadow addresses.

1.4. IP-Based Base Station Performs Routing Mechanism without Changing Routing Policy One operational principle in accordance with the present invention is that each IP-based base station will act as an IP-layer forwarder, as alluded to in FIG. 5. Now referring to FIG. 7, there is shown a pictorial representation of the processing effected by a base station so that the routing mechanism based on shadow addresses does not require a change in the routing policy of a base station. In particular, in one operational mode, iBS 701 (representative of, say iBS 1 (111)) uses the information in the IP header of an incoming packet (e.g., IP 0) from wireline interface 722 and a routing table to determine where the packet should be sent, and then forwards the packets to the correct outgoing radio channel, i.e. iBS 701 station performs the IP routing mechanism. However, it is not required that a base station run IP routing protocols to change its routing table. For instance, IP forwarding engine 707 may determine that IP 0 is bound for MS 1 (711) and, accordingly, forwards IP 0 as outbound packet IP 1 to MS 1 via electronic/radio path 715 in radio interface 721 and radio path 713. A description similar to the above also applies to MS 2 (712).

1.5. Assignment and Processing of Shadow Addresses

There exist many ways for a new base station to learn about or assign the shadow address for a MS. For example, the iBSs may obtain the shadow address for a MS from a network server responsible for assigning shadow addresses. Alternatively, and the focus in accordance with the present invention, is the case wherein the iBSs themselves can be responsible for assigning shadow addresses to MSs. In this case, the MS may carry its own shadow address and pass it along to the new base station or the new base station may obtain a MS's shadow address from the serving base station.

By way of elucidating the details of a representative technique for assigning and using a shadow address which illustrates the methodology whereby the MS carries its shadow address, it is assumed in the following description that: the serving iBS assigns a shadow address to a MS; the MS passes its assigned shadow address to a new iBS; and when a MS's shadow address conflicts with any shadow address currently in use in the new cell, the new iBS will negotiate with the serving iBS to resolve the conflict.

Figure 8:
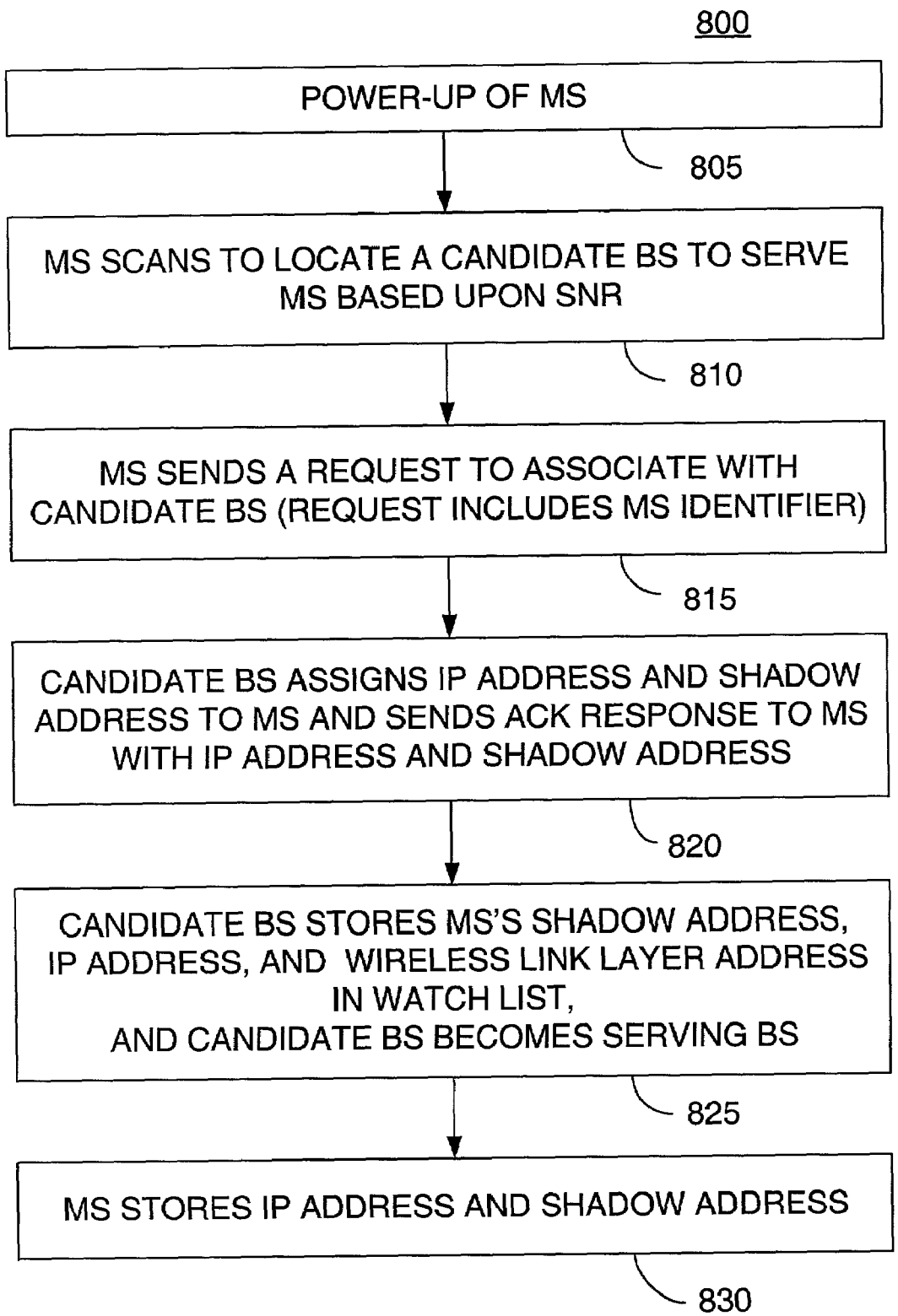
FIG. 8 is a flow diagram depicting the process of assigning a shadow address to a mobile station.

An illustrative technique for assigning a shadow address to a mobile station by the iBS is depicted by flow diagram 800 of FIG. 8. The process starts with processing block 805 when the MS is powered up in a wireless region. Next, as evidenced by processing block 810, the MS scans to locate a candidate iBS to serve the MS based upon the value of the signal-to-noise ratio (SNR) using a so-called "scanning algorithm" (the scanning algorithm is conventional to a mobile service environment, and it is carried out at the "physical" layer level). Once a candidate iBS is located, processing by block 815 is invoked whereby the MS sends a "request to associate" with the candidate iBS; the request includes the MS identifier (as described below) which is unique to the MS. Next, via processing block 820, the candidate iBS assigns a shadow address to the MS which is compatible with the wireline link layer of the subnet to which the iBS is connected. The MS may also need to obtain an IP address if it does not already have one (e.g., when the MS tries to use IP services for the first time) or if it needs a new IP address (e.g., when it moves into a new IP subnet). The MS may use any existing methods (e.g., DHCP) to obtain an IP address. In terms of the example used to fill the second row of Table 2, the IP address assigned is 128.44.12.111 and the shadow address assigned is F1:F7:04:2D:70:03. Processing block 825 is executed so that the candidate iBS stores the shadow address, IP address, and the wireless link layer address of the MS in the watch list and the candidate iBS becomes the serving iBS. Finally, as per processing block 830, the MS stores the IP address and the shadow address to be used during packet processing, as discussed in more detail later.

In the foregoing the term MS identifier was used, and the following is a brief description of one realization of such an identifier. A wireless network interface card (NIC) of a MS is assigned a unique address by the manufacturer of the particular NIC—this address is called the "MS MAC address" or, equivalently, the "MS identifier", where MAC is the acronym for Medium Access Control; the MAC Address is utilized at the "link" layer in the wireless network portion of a wireline/wireless network. Each MS identifier usually has 48 bits which can be formatted as follows: "B1:B2:B3:B4:B5:B6", where B1, B2, . . . is each one byte. Also, since each byte can be treated as containing two 4-bit nibbles, the MS identifier is such that each nibble can be expressed in hexadecimal. Thus, a typical MS identifier might be: "18:00:20:E8:42:F6", and it is unique to a particular MS, so it can be used as a universal identifier. In the foregoing description, the symbolism "xxxxxx" was used to denote the MS identifier, which must be compatible with all iBSs that the MS will roam to in the wireless network.

Figure 9:
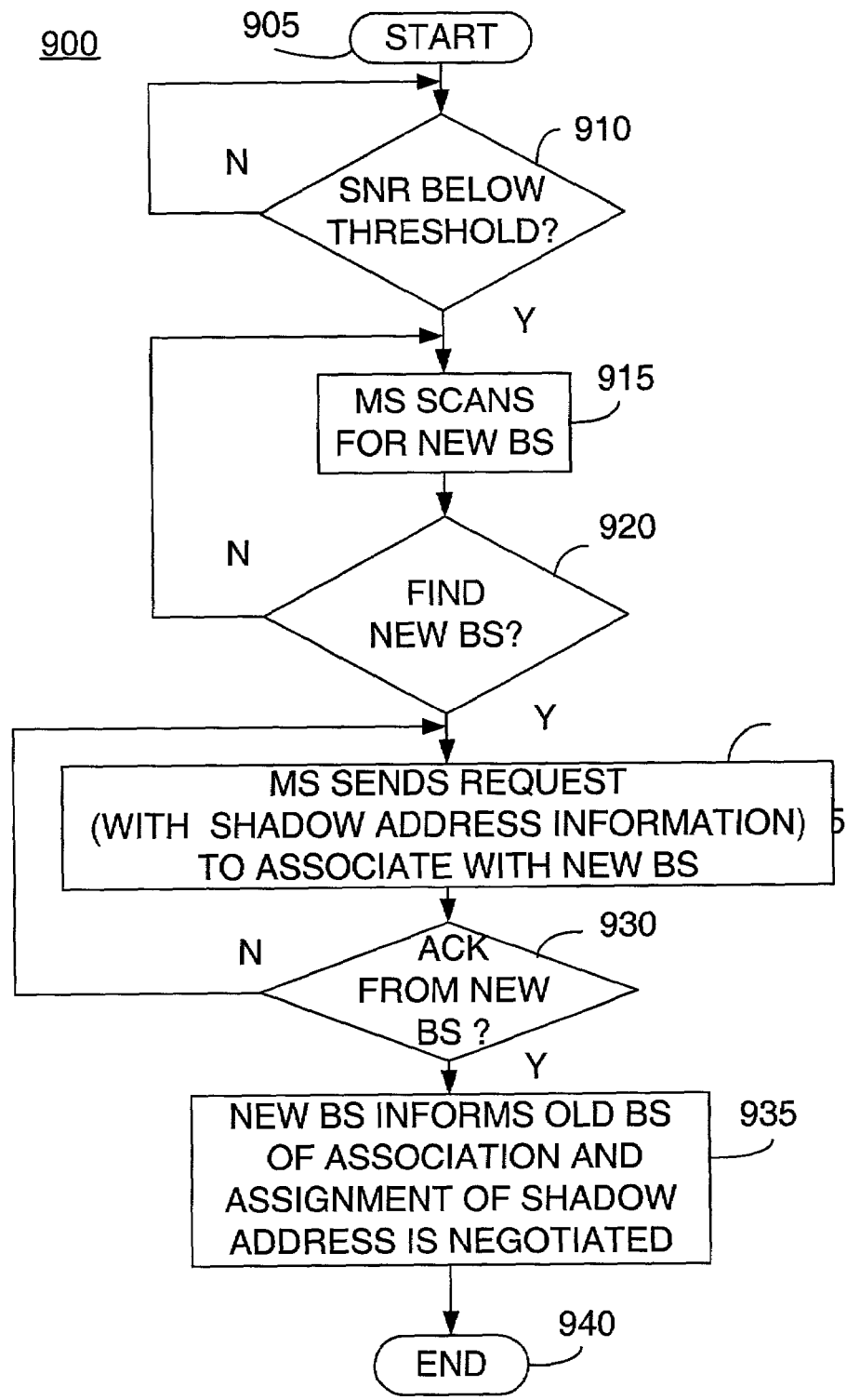
FIG. 9 is a flow diagram depicting the process by which a mobile station associates with a new base station using physical layer information and link layer messages.

Next, the process by which the MS interacts with a new base station to convey shadow address information pertaining to the MS is considered in overview fashion in FIG. 9. With reference to FIG. 9, there is shown flow diagram 900 for this process; the flow diagram emphasizes those differences over conventional processing brought about by the use of a shadow address. The process starts with processing block 905 whereby the MS is presumed to be powered up and being served by a base station (referred to as the "old base station" below), as covered by FIG. 8. The MS continuously monitors, via decision block 910, the incoming signal strength of the old base station to determine if the SNR falls below a prescribed threshold using the "scanning algorithm". If the SNR does not fall below a threshold (say 50% of the original SNR ratio), the MS continues to monitor the SNR. If the SNR falls below the threshold, then an operational mode of the MS is turned on so that the MS may communicate with a base station(s). Then via processing 915, the MS scans, using the physical layer, to locate a new base station with a higher SNR. Next, decision block 920 is invoked to determine whether or not a new base station has been located. Whenever a new base station has been located, the MS sends a request (including its shadow address and IP address) to associate with the new base station as evidenced by processing block 925. The new base station can either accept or reject the request to associate. If rejected, the MS continues to scan for a higher SNR. If accepted, the new base station updates its watch list with the shadow address and IP address information. The new base station sends an acknowledgement of receipt of the information, and the MS awaits an acknowledgement from the new base station so as to turn off the monitor mode (decision block 930). The new base station informs the old base station of the association, via processing block 935; details of processing by block 935 from the perspective of the base stations are covered in FIG. 11. Once soft handoff is complete, then the new base station will replace the old base station as the serving base station. During soft handoff, the packets being received from the multiple base stations can be used advantageously to determine the true contents of the packet from its replicated versions.

Figure 10:
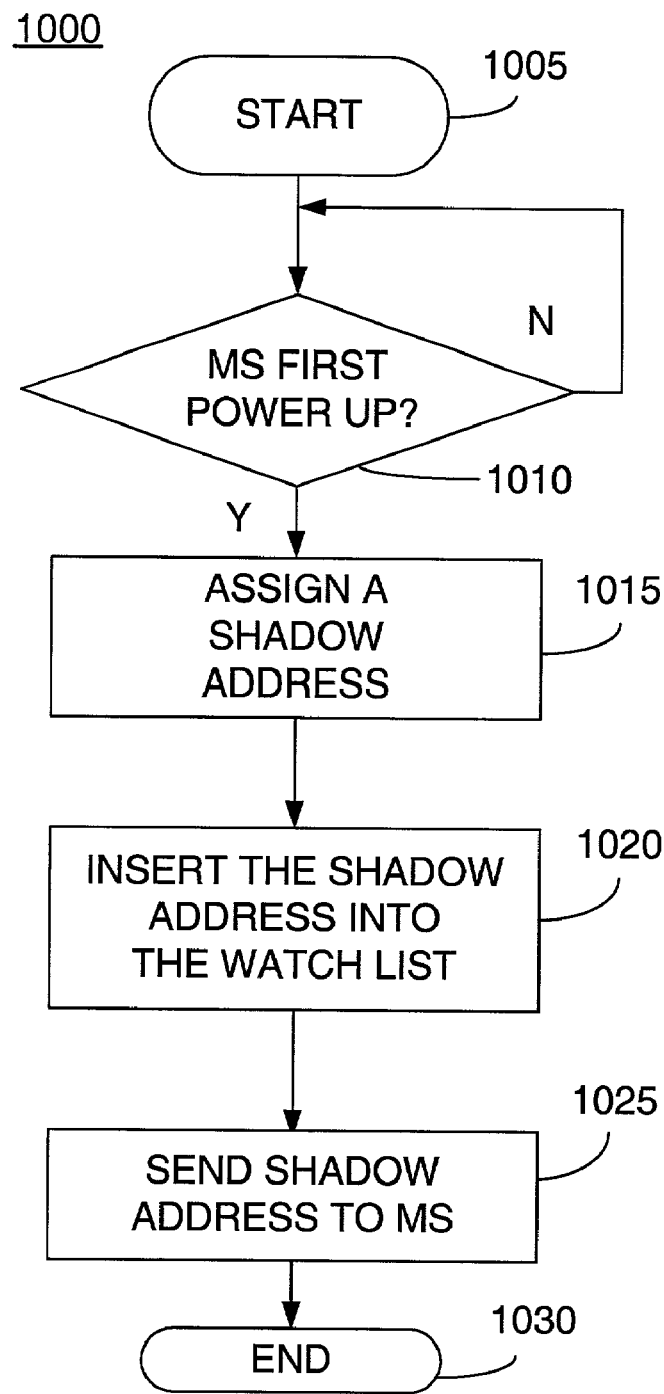
FIG. 10 is a flow diagram depicting the process of assigning a shadow address by a base station upon first power-up of a mobile station.

Now with reference to FIG. 10, there is shown flow diagram 1000 from the viewpoint a serving iBS upon power-up of a MS within the wireless region served by the iBS. Processing starts with block 1005. Next, decision block 1010 is entered to determine whether or not this is the first power-up of the MS. If not, then there is no further processing for this MS. If this is the initial power-up, then block 1015 is entered to assign a shadow address to the MS. Then the newly assigned shadow address is inserted into the watch list of the iBS, as per processing block 1020. Finally, the shadow address is transmitted to the MS via processing block 1025. Processing ends with block 1030.

Figure 11:
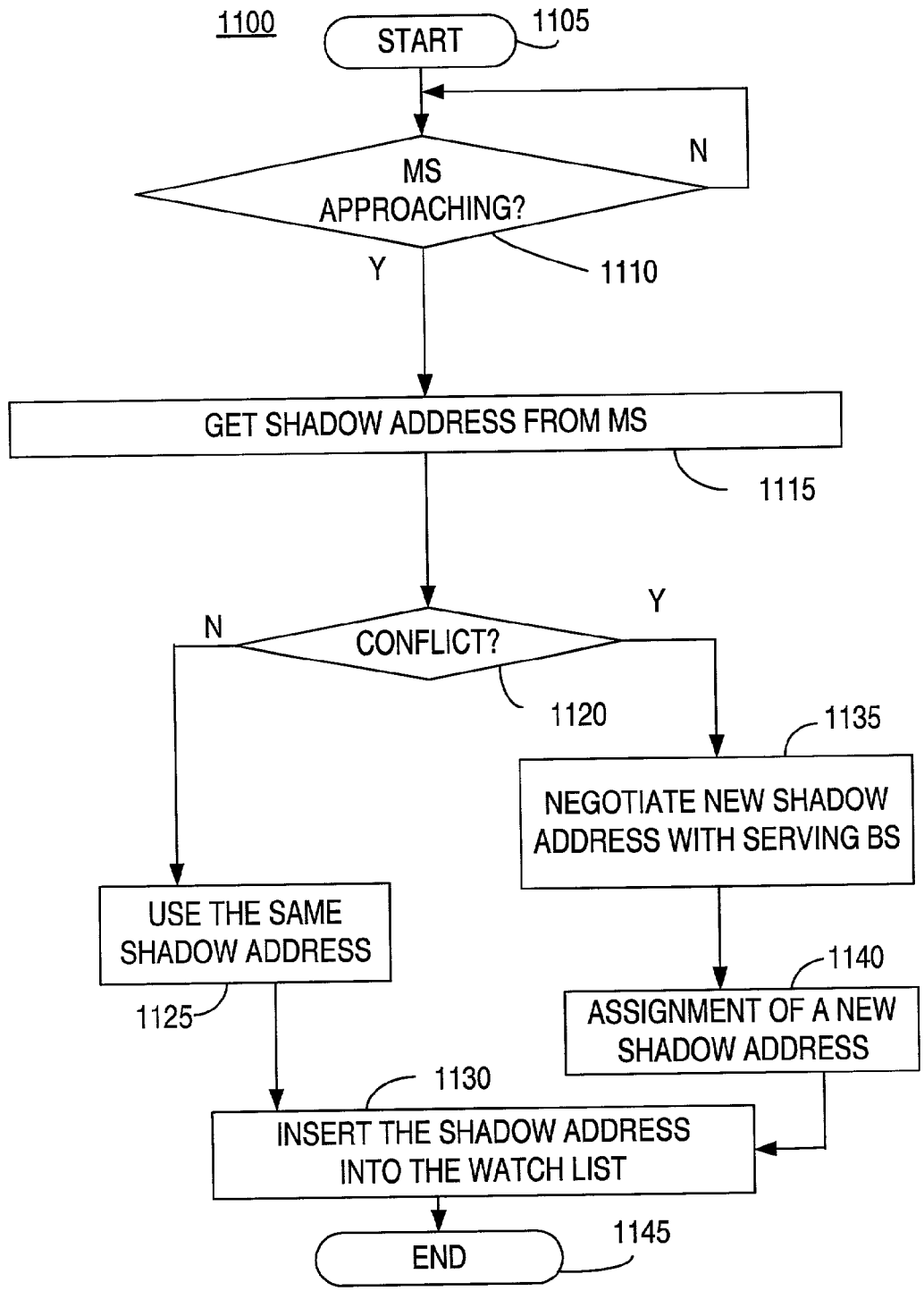
FIG. 11 is a flow diagram depicting the process of assigning a shadow address by a candidate base station for a powered-up mobile station handled by a serving base station.

Now with reference to FIG. 11, there is shown flow diagram 1100 representative of a candidate base station that is to serve the powered-up MS as it moves from a serving base station into the overlap of the wireless region of the serving base station and the candidate base station. Processing starts with block 1105. Next, decision block 1110 is entered to determine if there is an approaching MS (known via the scanning algorithm discussed above). Processing reverts to block 1110 if there is no approaching MS. For an approaching MS, via processing block 1115, the shadow address is received from the MS. Then decision block 1120 is invoked to determine if there is a conflict with a shadow address already in the watch list of the candidate base station. If there is no conflict, then the original shadow address is handled by processing block 1125 and is inserted into the watch list of the candidate base station. If there is a conflict, processing block 1135 is invoked to effect a negotiation between the serving base station and the candidate base station to determine a suitable replacement shadow address acceptable by both the serving base station and the candidate base station. Once this negotiation is complete, a new shadow address is assigned via processing block 1140, and entered into the watch list of the candidate base station (as well as replacing the one in the watch list of the serving base station as a result of the negotiation); also, the candidate base station becomes a new iBS. Processing ends with block 1145.

Figure 12:
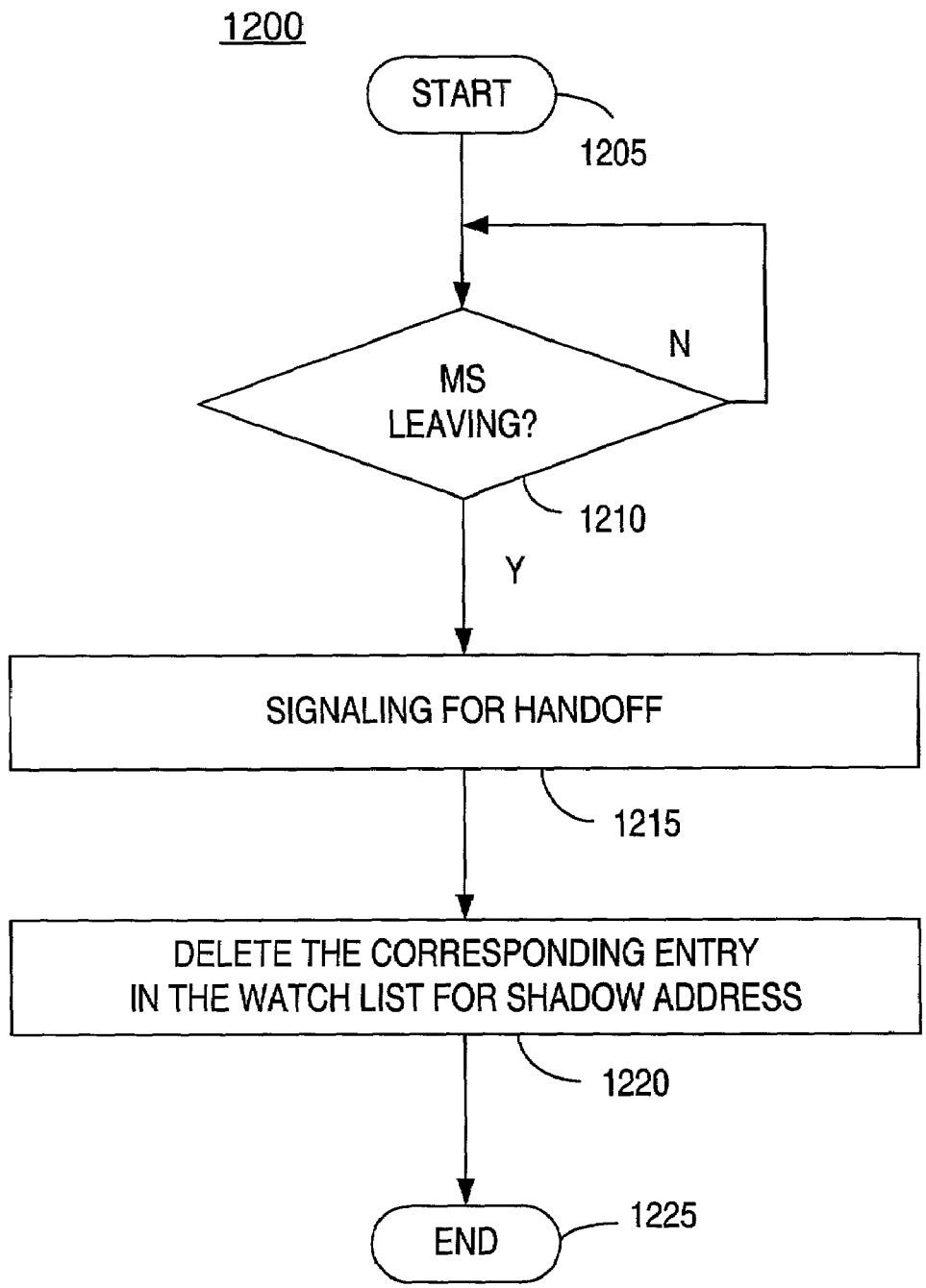
FIG. 12 is a flow diagram depicting the process of deleting a shadow address from a watch list.

Referring now to FIG. 12, there is shown flow diagram 1200 representative of the process for deleting a shadow address from the watch list of a base station once the MS moves outside the range of that base station. Processing starts with block 1205. Next, decision block 1210 is entered to determine is the MS is leaving the coverage range of the base station. If not, there is no further processing. If the MS is leaving the coverage range, then processing block 1215 is entered to signal that a handoff is to be carried out so that the new base station, differentiated from the old serving base station, will now serve the MS. Once handoff is complete, then processing block 1220 is entered to delete the shadow address from the old base station. Processing ends with block 1225.

The technique whereby the new iBS obtains shadow address information from the old iBS, rather than from the MS directly, is now described. The teachings of FIGS. 8–12 can be readily applied to this case. It is presumed that the MS is already homing on the old iBS and is now roaming to the overlap wireless region also served by the new iBS. The MS scans to locate the new iBS. Once the new iBS is located, the MS sends a request to associate with the new iBS; the request includes the MS identifier. The new iBS sends a broadcast message to all other base stations on the subnet to determine which base station has the MS identifier in its watch list. The old iBS has the MS identifier in its watch list, so it sends a response to the new iBS with both the IP address and the shadow address contained in the old iBS's watch list. Conflicts can be resolved by interchanging messages between the old and new iBSs, which results in a unique shadow address for the MS now stored in the watch lists of both the new and old iBSs.

2. Soft Handoff Across Subnets 2.1 Packet Distribution Across Subnets

Figure 13:
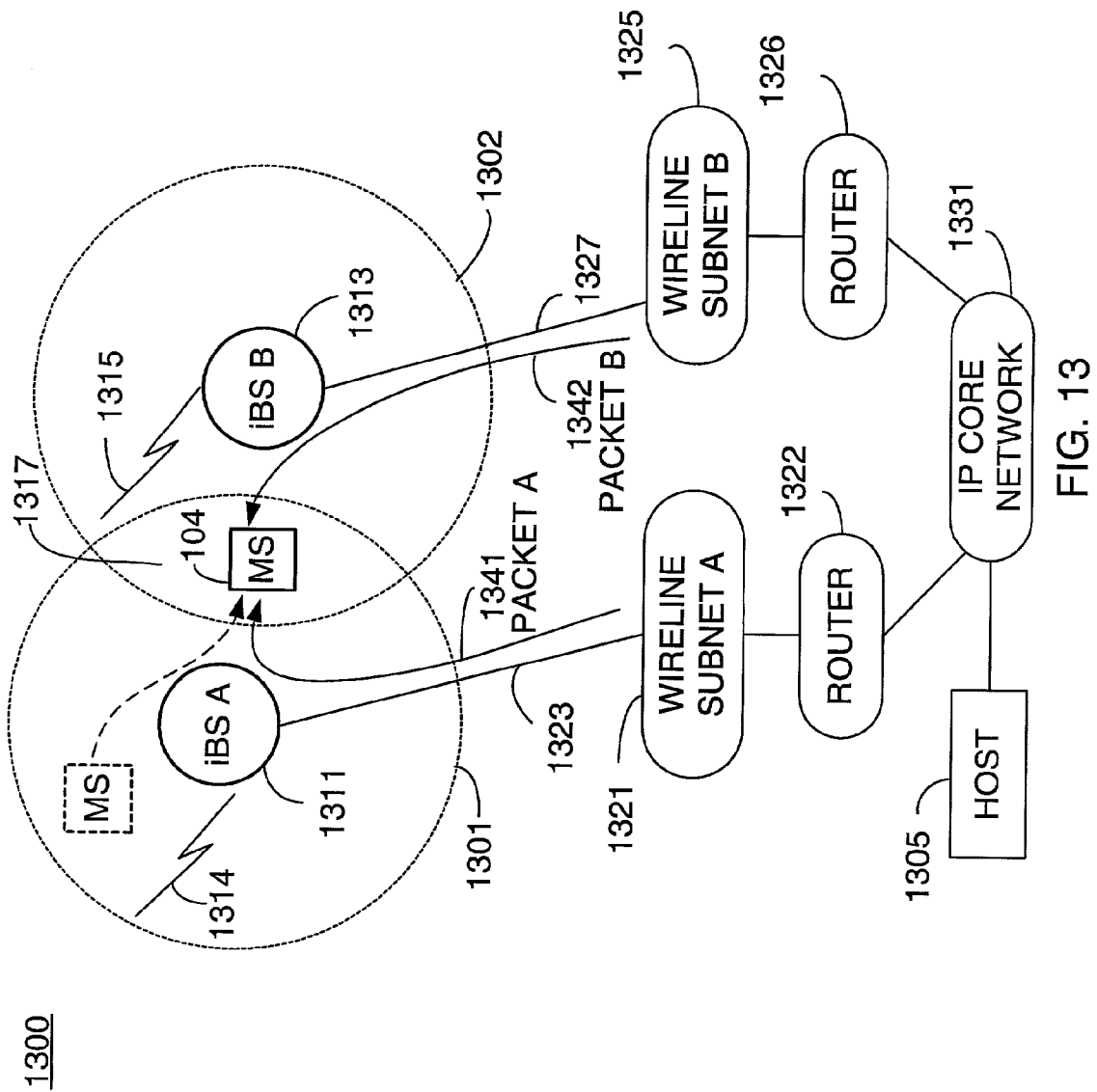
FIG. 13 is a pictorial representation of a mobile station roaming from one cellular region served by one subnet to another cellular region served by another subnet during the process of soft handoff.

With reference to FIG. 13, there is shown system 1300 that depicts the scenario for soft handoff across Subnets. In particular, iBS A (1311) is connected to wireline Subnet A (1321), whereas iBS B (1313) is connected to wireline Subnet B (1325). In turn, Subnet A is coupled to router 1322 and Subnet B is coupled to router 1326 (it is possible, without loss of generality, that routers 1322 and 1326 may coalesce into a single router). Both routers 1322 and 1326 are then coupled to IP core network 1331. Subnet A, Subnet B, and the IP core network may have any arbitrary network topology. In the arrangement illustrated in FIG. 13, an IP packet sent via iBS A and iBS B to MS 104 during soft handoff, as depicted by Packet A (1341) and Packet B (1342), respectively, originates from host 1305 coupled to IP core network 1331. Accordingly, when the mobile station moves across IP Subnets, multiple copies of the same data are to be sent via multiple base stations to the mobile station (that is, Packet A and Packet B must be identical).

The manner of achieving the required packet duplication is now discussed for the following heuristic case: a so-called "nearest router" is responsible for IP packet duplication and distribution, namely with reference to FIG. 13, router 1322, since this router is "nearest" to the MS 104 and Subnet A brought about by MS 104 initially homing on iBS A.

2.2 Packet Duplication

Once the soft handoff across IP Subnets A and B starts, that is, as MS 104 migrates from cell 1301 to cell 1302 in handoff region 1317, iBS A, iBS B, and router 1322 exchange information about MS 104. The information is in a form summarized by packet duplication information which, for the case of the nearest router 1322, that is, the router initially handling MS 104, is shown in Table 4.

TABLE 4

| MS Link Layer Address in Wireless Network | MS's IP Address in Subnet A | Forwarding IP Addresses in other Subnets | MS's Shadow Address in Subnet A |
|---|---|---|---|
| xxxxxx | $IP_A$ | $IP_B, \ldots$ | $MAC_{104}$ |
| ... | $IP_1$ | $IP_2, \ldots$ | NIL |
| ... | ... | ... | ... |

The Forwarding IP Address for a MS can be either the IP address used by the MS directly to receive IP packets in the new subnet or the IP address of an agent (e.g., a Mobile IP Foreign Agent or an iBS) in the new subnet that is responsible for intercepting the IP packets destined to the MS and then forwarding the packets to the MS.

Figure 14:
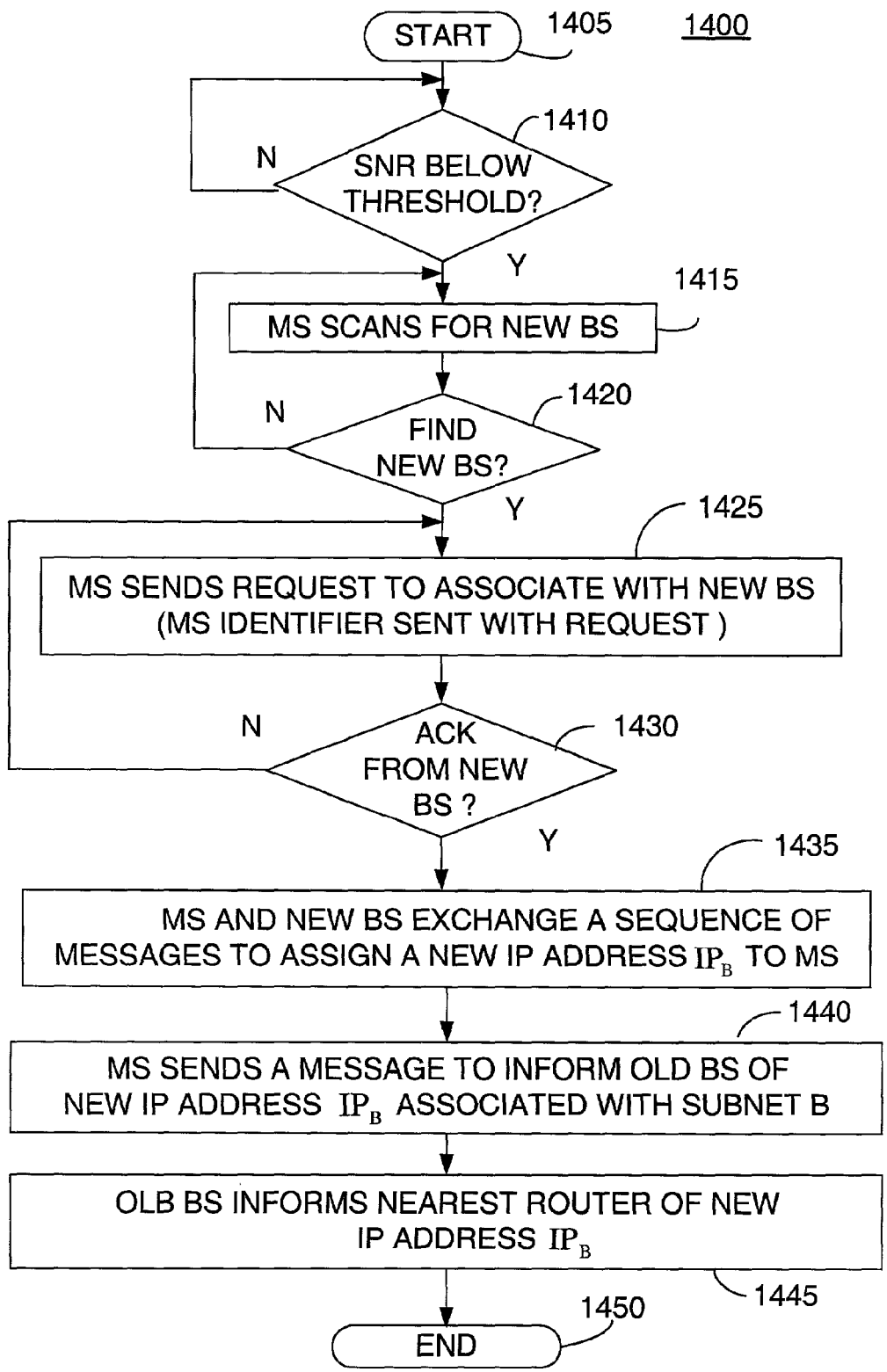
FIG. 14 is a flow diagram depicting an illustrative technique for generating entries for the Packet Duplication table, including a multiplicity of IP layer address associated with a roaming mobile station

The process of filling in, for example, row 1 of Table 4 is as follows. First, the procedure for assigning a shadow address to MS 104 in Subnet A has been discussed with reference to FIG. 8. Then the MS sends information in its watch list to nearest router 1322 so this router can be compiling the duplication table, namely, columns 1, 2, and 4 can be filled in. Referring now to flow diagram 1400 in FIG. 14, the technique for associating $IP_B$ with MS 104 as served by iBS B and then informing router 1322 of the assignment of $IP_B$ for entry into column three of Table 4 is depicted.

The process starts with processing block 1405 whereby the MS is presumed to be powered up and being served by a base station (referred to as the "old base station" below), as covered by FIG. 8. The MS continuously monitors, via decision block 1410, the incoming signal strength of the old base station to determine if the SNR falls below a prescribed threshold using the "scanning algorithm". If the SNR does not fall below a threshold (say 50% of the original SNR ratio), the MS continues to monitor the SNR. If the SNR falls below the threshold, then an operational mode of the MS is turned on so that the MS may communicate with a base station(s). Then via processing 1415, the MS scans, using the physical layer, to locate a new base station with a higher SNR. Next, decision block 1420 is invoked to determine whether or not a new base station has been located. Whenever a new base station has been located, the MS sends a request (including its MS identifier and its $IP_A$ address) to associate with the new base station as evidenced by processing block 1425. The new base station can either accept or reject the request to associate. If rejected, the MS continues to scan for a higher SNR. If accepted, the new base station (iBS B) sends an acknowledgement that it will associate with the MS. The MS awaits an acknowledgement from iBS B so that the MS may turn off its monitor mode (decision block 1430). The MS and iBS B exchange a sequence of messages using, for example, the Dynamic Host Configuration Protocol, to assign the new IP address $IP_B$ to the MS for use in Subnet B, as evidence by processing block 1435. Then the MS sends a message as part of its normal interchange with iBS A to inform iBS A of the new $IP_B$ address, as per processing block 1440. Finally, the iBS A sends a message containing the new address $IP_B$ to the nearest router (1322), as per processing block 1445, for completing the remaining entry in the Packet Duplication Table 4, namely, column three. Processing is ended by block 1450.

Once soft handoff is complete, then the new base station will replace the old base station as the serving base station. During soft handoff, the packets being received from the multiple base stations can be used advantageously to determine the true contents of the packet from its replicated versions.

It is possible that more than one "new" candidate base station may be located during the process of "scanning" for a new base station or base stations. Each new base station independently follows a process as elaborated upon in the foregoing for the interaction between iBS A and iBS B. The interaction of only iBS A and iBS B has been discussed for the sake of specificity but without loss of generality.

Now, for any incoming IP layer packet arriving from host 1305, router 1322 routes, via iBS A, the original Packet A destined for IP address $IP_A$ of MS 104 using its standard routing procedure. In addition, router 1322 duplicates the packet and distributes the duplicate to MS 104 as Packet B via iBS B. In general, the procedure is that when a nearest router receives a packet destined to the IP addresses in first column of Table 4, it duplicates the packet and sends the duplicates to the IP address(es) in the third column of Table 4. Therefore multiple streams will be sent to all base stations involved in soft handoff.

In some situations, a nearest router may need to respond to the ARP REQUEST to receive the IP packets destined for mobile 104. Therefore the shadow address of MS 104 is maintained in second column of Table 4. Also, if an iBS connects to multiple nearest routers, only one of the nearest routers is chosen to store the shadow address of MS 104. Others will simply put NIL in the field, as exemplified by the second row of Table 4. Similarly, signaling is performed in iBSs A and B and the nearest router 1322 when soft handoff is completed, so the entry of the mobile station in a Packet Duplication table will be deleted. Such signaling can be done along with the signaling used by the mobile station to normally perform soft handoff.

EXAMPLE 1

By way of specificity to summarize the procedure step-by-step, consider the arrangement of FIG. 13 wherein Packet A is sent from correspondent host 1305 attached to IP core network 1331, that is, the packet has IP destination address $IP_A$ and is sent from "outside" Subnet A. Since Packet A with destination address $IP_A$ is sent outside Subnet A, it is eventually routed to router 1322. Once router 1322 receives Packet A, it checks its Duplication Table. Packet A therefore will be duplicated with IP destination address of $IP_B$ as depicted in the third column of Table 4, and this duplicated packet is be routed to MS 104 via iBS B. Besides, Packet A is routed to MS 104 via iBS A as a standard packet.

If there are multiple nearest routers an iBS connects to, only one of them receives the packet sent from host 1305. Therefore only one nearest router will duplicate and distribute the packet.

As outlined above, each time a mobile station moves to a new Subnet, it must acquire a private or public IP address from a server (e.g. DHCP server or Foreign Agent) for that specific Subnet. This is part of the normal registration and configuration. However, which IP address correspondent host 1305 should use to reach the mobile station depends on how IP-layer mobility is supported. If, for example, basic Mobile IPv4 is employed, host 1305 always uses the home address of the mobile station. The Forwarding IP Address, $IP_B$, for the MS in the new cell would be the new care-of address the MS obtains for receiving packets in the new subnet. The normal Mobile IPv4 Home Agent process directs a packet to the MS's care-of address currently registered with the Home Agent. In this example, the MS can delay the Mobile IPv4 address binding operation for its new care-of address $IP_B$ until soft handoff is completed so that the Mobile IPv4 Home Agent can continue to direct packets destined to the MS to the old base station during the handoff. Router 1322 will then duplicate the packet and forward a copy to the new base station as described above. Upon completion of soft handoff, the MS will perform Mobile IP address binding operation for its care-of address to be used in the new cell so that later packets will be directed to this new care-of address. To reduce packet loss during the switch over from old IP address to the new IP address, removal of the Duplication Table in Router 1322 may be delayed for a pre-determined or random time after the completion of soft handoff so that packets already sent to the old cell can continued to be forwarded by Router 1322 to the new cell even after the MS loses its radio connection with the IBS A.

EXAMPLE 2

For this example, suppose for the moment that host 1305 is connected to Subnet A, that is, Packet A is sent from "inside" Subnet A, so that both router 1322 and iBS A respond to an ARP REQUEST with the mobile station's shadow address. Therefore, Packet A eventually arrives at both iBS A and router 1322. The one arriving at router 1322 is forwarded to the IP address(es) in third column of the Table 4 stored in router 1322. Since this packet arriving at router 1322 is due to the entry in the Duplication Table rather than the normal routing table, router 1322 does not perform normal routing so the packet will not be sent to iBS A again. In this example, only one of the nearest routers maintains the shadow address in its Duplication Table, so that only one of them duplicates and distributes a packet.

2.3 Distribution of Same Data in Multiple Streams

When the nearest router sends out the duplicated IP packets, these packets have different IP addresses of the mobile station so they can be routed to different base stations. To effect soft handoff, packets must be exactly the same including any field in the header so combining of fields can be done in signal level by the mobile station. Packets duplicated and distributed from the nearest routers however are different in their destination IP addresses.

However, all the other fields other than the IP destination address are same when the nearest router duplicated the packets. As described in Section 1, the base stations perform signaling and maintain a Watch List for mobile stations involved in the soft handoff process. Base stations therefore know which mobile stations are currently in the process of soft handoff across Subnets. The new base station then changes the IP destination address of the packet for the mobile station in the Watch Lists of the base station to the mobile station's old IP address (IP_A). But instead of broadcasting these IP packets, the base stations will further encapsulate the IP packets to link layer frames with the link layer address in the Watch List as the destination address. These link layer frames will be sent from base stations to the mobile over the air interface without broadcasting; upon receipt by the mobile station, the link layer information is stripped from the frame, leaving only the packet with the generic broadcast address which is identical for all packets. The involved mobile station therefore will receive exactly same data from multiple base stations.

2.4 Packet Selection in Reverse Link

The nearest router described above for packet distribution could be the point for packet selection as well, that is, the process of selecting one of the packets arriving from the MS via a corresponding plurality of base stations as the propagated pakcet.

For soft handoff in circuit cellular networks, the Nearest Router receives RLP (Radio Link Protocol) frames from multiple base stations. In addition to the payload, each RLP frame also comprises of SIR (Signal Interference Ratio), Frame Quality Indicator (FQI), Symbol Error Rate (SER), and so forth. Based on this information, one frame is singled out as the "best" frame for further distribution in the network. To preserve such layer-2 information, the iBSs encapsulate layer-2 frames to IP packets, then send them to the Nearest Router, which then decapsulates the IP packets, selects one layer-2 frame, and assembles final IP packets. The restored packets are then routed to the correspondent host (1305) by the Nearest Router. This approach allows the iBSs to perform soft handoff in reverse link in layer-2 as that in today's cellular networks. The only added function in iBSs is to encapsulate the RLP frame to IP packets. The Nearest Router, however, will need to perform decapsulation, selection, and IP assembly.

An alternative approach is to generate an IP packet when the iBS receives a RLP frame. The iBS generates an IP packet with the payload of the RLP frame and the decision criteria. Once the Nearest Router receives the RLP frame, it can select a packet based on IP payload, then assemble the original IP packet sent by MS and route it to the correspondent host.

Packet selection in the reverse direction has been described with respect to soft handoff across subnets. It is readily contemplated that an analogous description applies to packet selection in the reverse direction for soft handoff within a subnet.

3. Data Content Synchronization

One potential way to achieve data content synchronization at the MS is to have all iBSs transmit copies of the same packet to the mobile station at precisely the same time. However, scheduling the precise timing for simultaneous transmissions of IP packets on different IP devices (in this case, iBSs) is very difficult to implement in a real IP network.

This Section describes a new IP-layer procedure, referred to as the "Fluid Synchronization" method, performed by the iBSs to ensure that the data arriving at the MS at the same time from multiple iBSs are copies of the same data. The method is an IP-layer procedure and is therefore independent of the link layer protocols used in the radio system. The procedure is performed by iBSs rather than by the MS, which avoids any modification to the MS.

Rather than trying to schedule the precise timing for simultaneous IP packet transmissions on multiple iBSs, the methodology ensures that the streams of layer-2 data blocks sent by multiple iBSs to the MS are "matchable streams". Matchable streams are streams of layer-2 blocks (or more precisely, the physical layer data resulting from these blocks) that can be correctly matched and combined by the MS using today's radio technologies (e.g., a RAKE receiver as discussed in the reference by V. K Garg, entitled "IS-95 CDMA and cdma 2000:Cellular/PCS Systems Implementation", pp. 60–62, published by Prentice-Hall, 2000).

Suppose that the streams of WP packets sent by different iBSs to the MS have either no gaps (i.e., no missing IP packets) or identical gaps. Then, the layer-2 data block streams from the iBSs to the MS will be matchable if, for any k, the $k^{th}$ layer-2 data block sent by both iBSs to the MS contains the same amount of payload (i.e., have the same length). The matching layer-2 data blocks (i.e., data blocks that are copies of the same data) from different iBSs do not have to arrive at the mobile at precisely the same time. The mobile's radio system can synchronize these data blocks using today's radio channel synchronization techniques, as long as the delay jitters are not excessively large, which usually is one time slot length of a frame.

It is also important to note that generating matchable streams of layer-2 data blocks does not require each iBS to send copies of the same IP packet to the layer-2 protocol at precisely the same time for delivery to the MS. Furthermore, matchable streams of layer-2 data blocks can be generated by performing only IP-layer processing on the iBSs alone.

Figure 15:
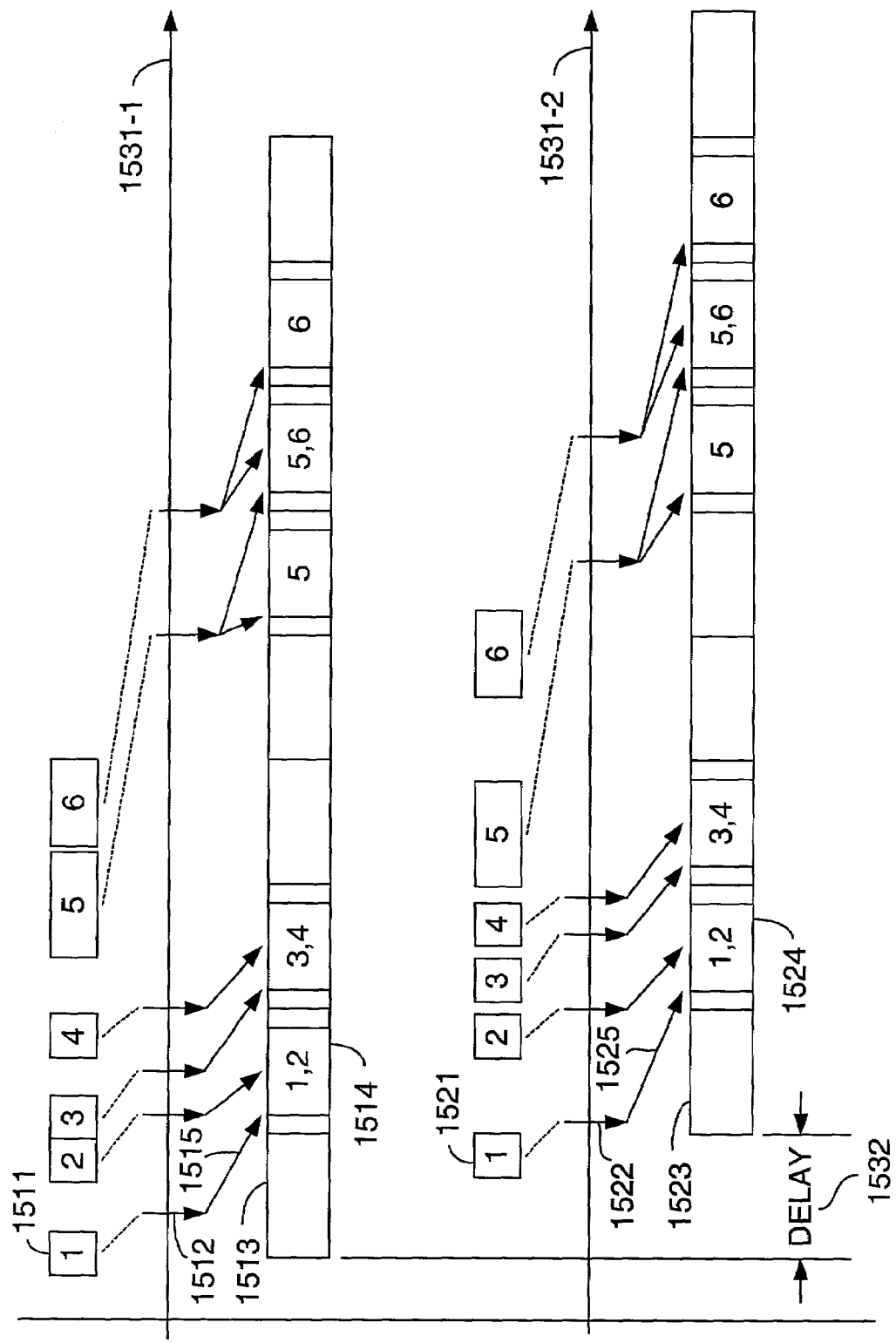
FIG. 15 is a time diagram depicting the time relationship of packets and frames as delivered by two base stations to a mobile receiver involved in soft handoff across subnets.

FIG. 15 illustrates how matchable streams of layer-2 data blocks can be generated when the IP packets are sent by different iBSs to the layer-2 protocol on their radio interfaces at different times for delivery to the MS. With reference to FIG. 15, there is shown a stream of numbered packets, designated "1" (1511), "2", "3","4", "5", "6", and so forth, arriving at, for example, iBS A of FIG. 13. Similarly, the same stream of packets arrives at iBS B, wherein packet 1521 is the first packet in the stream. Note that the packets arrive at the respective iBSs at different times (time line 1531-1 is used to reference packets for iBS A, whereas replicated time line 1531-2 is used for packets arriving at iBS B). IP packets are sent to the link layer for delivery over-the-air to the MS at the times shown by the downward arrows on the respective time lines; for example, packet 1511 is transmitted at the time shown by arrow 1512, and packet 1521 is transmitted at the time shown by arrow 1522. The over-the-air link layer receives the packets as data blocks and fills the data blocks into link layer frames. The over-the-air link layer frames corresponding to iBS A are shown by the stream of frames starting with 1513, 1514, and so forth. Similarly, the over-the-air link layer frames corresponding to iBS B are shown by the stream of frames starting with 1523, 1524, and so forth. Frames 1513 and 1523 are blank, and they are shown primarily to demonstrate that there is a random delay (1532) between the two streams of frames. As long as the random delay is within the synchronization capability of the receiver technique, fluid synchronization can be effected. The "sideways" arrows, such as arrow 1515, depict when the iBS A IP packets sent to the link layer for delivery over-the-air have been fully processed and are encapsulated into frames. Thus, frame 1514 encapsulates the data blocks derived from packets "1" and "2" from iBS A. Similarly, the next frame encapsulates data from packets "2" and "3". Because the data block associated with packet "5" undergoes a significant delay in delivery, the data block for packet "5" is not ready for encapsulation until the fifth frame. Moreover, this data block is too long for a single frame, so it is used to partially fill the next succeeding frame, along with data from packet "6". Finally, another frame is needed to complete delivery of packet "6" because of its length.

Similarly, the "sideways" arrows, such as arrow 1525, depict when the iBS B IP packets sent to the link layer for delivery over-the-air have been fully processed and are encapsulated into frames. Thus, frame 1524 encapsulates the data blocks derived from packets "1" and "2" from iBS B. Similarly, the next frame encapsulates data from packets "2" and "3". Because the data block associated with packet "5" undergoes a significant delay in delivery, the data block for packet "5" is not ready for encapsulation until the fifth frame. Moreover, this data block is too long for a single frame, so it is used to partially fill the next succeeding frame, along with data from packet "6". Finally, another frame is needed to complete delivery of packet "6" because of its length.

Based on the observations described above, a Basic Synchronization Procedure (BSP) is as follows (the Radio Link Protocol (RLP) is used as an exemplary radio layer-2 protocol in the following discussions). Starting from the delivery of the same IP packet to the mobile, each iBS will 1) Use RLP frames of identical length
2) Deliver only fully filled RLP frames to the MS unless
   a) a timer $T_p$ expires, or
   b) instructed by the upper layer (i.e., the IP layer) to send the current data.

In real networks, several events may cause a loss of data content synchronization when the above method is used. For example, gaps may randomly occur in the IP packet streams sent by different iBSs to the mobile. Also, when timer $T_p$ times out or when the IP layers on different iBSs instruct their layer 2 to send the current available data, the resulting layer-2 data blocks from different iBSs may not contain an identical amount of payload.

To correct for these events, a data content re-synchronization procedure is described that can quickly bring the multiple layer-2 data block streams from different iBSs back to synchronization when loss of data content synchronization occurs. The foundational principle is that the iBS which detects (or suspects) a loss of data content synchronization will negotiate with the other iBSs to restart the BSP procedure from a new IP packet.

This following describes the data content re-synchronization procedure using packet gaps as an exemplary cause of loss of data content synchronization. To help iBSs detect gaps in IP packet streams, the source or the entity responsible for packet distribution can number the packets (e.g., using the 16-bit identification field or an optional field in the IP header) and increment the packet stream number by one each time an IP packet is sent.

Figure 16:
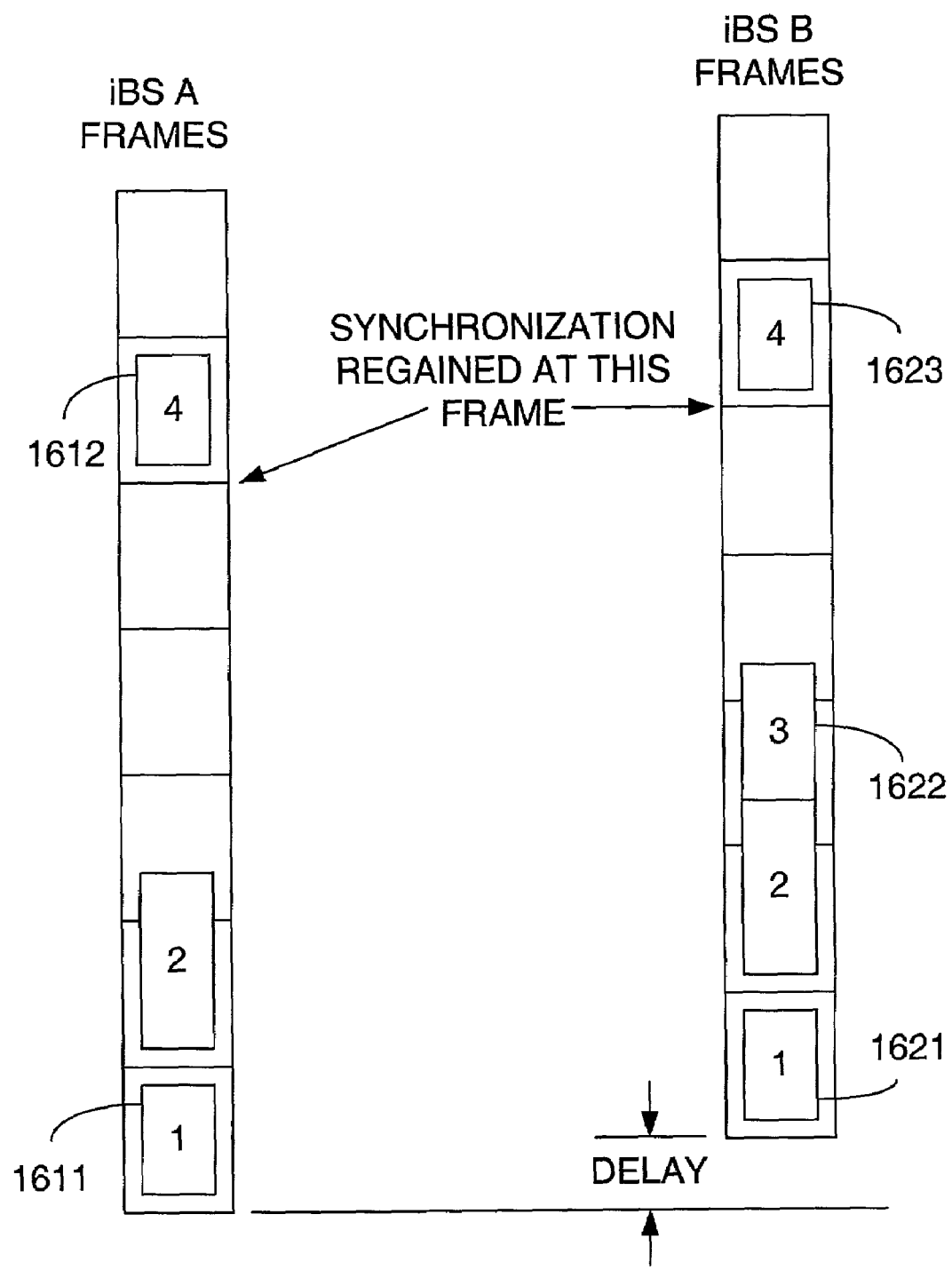
FIG. 16 is a pictorial representation illustrating recovery of synchronization for matchable packet streams during soft handoff.

The depiction of FIG. 16 is a pictorial representation of the results to be determined by the re-synchronization procedure. In particular, FIG. 16 illustrates two streams of frames sent to the MS from iBS A and iBS B, namely, the stream from iBS A encapsulating packets 1611, . . . , 1612, and the stream from iBS B encapsulating packets 1621, . . . , 1622, . . . , 1623. The frames from iBS B are delayed relative to the frames from iBS A, as already pointed out in FIG. 15. In the depiction of FIG. 16, the frame containing packet "3" from iBS A has been "lost" in the over-the-air delivery from iBS A to the MS. Data content resynchronization is regained at the RLP frames 1612 and 1623, respectively, for iBS A and iBS B, based upon the above data content synchronization procedure now discussed in steps (a)–(f) below.

Figure 17:
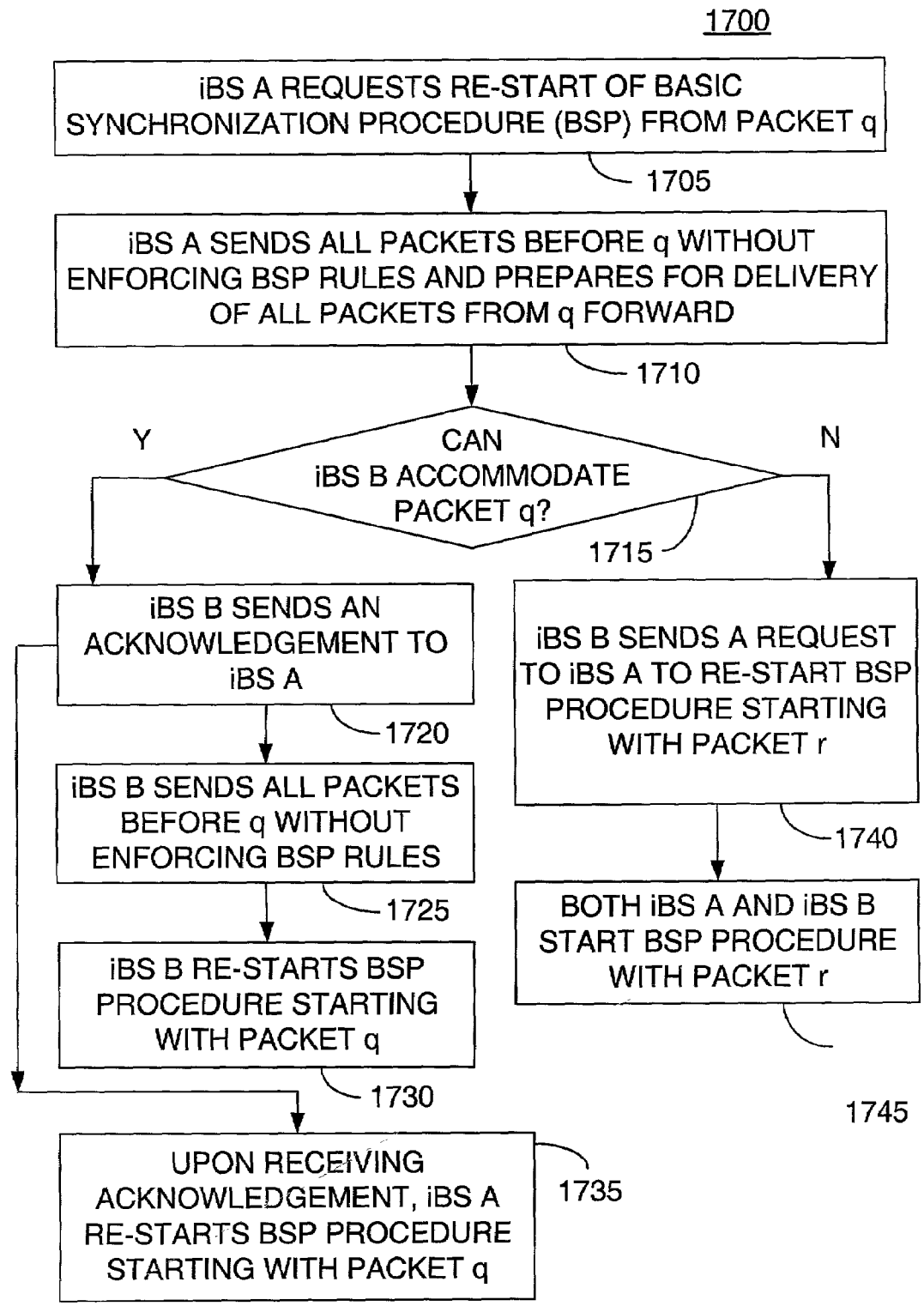
FIG. 17 is a flow diagram depicting the algorithm to regain synchronization for matchable packet streams during soft handoff.

Suppose that iBS A detects a gap between packet k and packet m (m>k) in the stream of IP packets destined to the MS. That is, iBS A has received packets k and m but has not received any packet between packets k and m. iBS A will initiate the following data content re-synchronization procedure, discussed with reference to flow diagram 1700 of FIG. 17 (as a shorthand, a number x in a layer-2 frame indicates that the layer-2 frame contains data from the IP packet with stream number x):

- (a) 1705: iBS A requests iBS B to re-start the BSP procedure from a packet q (q≧m).
- (b) 1710: iBS A immediately sends to the MS all the packets it has received before packet q without enforcing the BSP rules and halts the delivery of packet q and the packets arrived after packet q.
- (c) 1715: determine if iBS B can (or has a high level of confidence that it can) re-start data synchronization as requested by iBS A (e.g., when iBS B has received packet q and has not yet sent it to the MS, or has not yet received packet q).
- (d) if so, iBS B will positively acknowledge iBS A's request (1720). Then, iBS B will immediately send to the MS all the packets it received before packet q without enforcing the BSP rules (1725). iBS B will then restart the BSP procedure from packet q (1730). In other words, layer-2 transmission of packet q will start from the beginning of a new layer-2 frame after the packets before q have been delivered. Further, starting from packet q, layer-2 transmission will follow the BSP rules.
- (d) 1735: upon receiving positive acknowledge from iBS B, IBS A will restart the BSP procedure from packet q.
- (e) if iBS B cannot re-start re-synchronization as requested by iBS A (e.g., iBS B may have already sent packet q to the MS), iBS B will select a new packet r after packet q (r>q) and requests iBS A to start re-synchronization at packet r (1740).
- (f) both iBS A and iBS B start BSP procedure commencing with packet r (1745).

The re-synchronization procedure described above can be used to re-gain data content synchronization when loss of data content synchronization is caused by other events besides gaps in IP packet streams. If, for example, $T_p$ on iBS B expires before a RLP frame is fully filled, iBS B will send the partially filled frame to the MS. However, this may lead to loss of data content synchronization. To re-gain data content synchronization, iBS B can request iBS A to re-start the BSP procedure from a new packet. To reduce the impact of loss of data content synchronization caused by unexpected events, the iBSs currently involved in soft handoff may periodically re-start the data content re-synchronization procedure.

4. Smooth Handoff

This Section discusses how to leverage the Shadow Addresses maintained in each base station to achieve "smooth handoff". Smooth handoff means that the mobile station still can transmit and receive packets while it is performing handoff. Ideally there will be no delay and packet loss in smooth handoff. Again, a macro-diversity system is assumed, that is, the system is such that a mobile station is capable of transmitting and receiving data from multiple base stations at the same time. Although smooth handoff in a macro-diversity system is feasible in current circuit-based centralized cellular systems, the focus of this Section is on packet-based IP networks in which there is no central controller. In addition, the subject matter in accordance with the present invention has the following unique features:

- (a) the same algorithms and table can be used for both link- and network-layer handoffs. The base station does not need to distinguish the type of handoff, and does not need to run two handoff algorithms. This makes the IP-based base station efficient and also reduces the cost.
- (b) the same algorithms and table can be used for mobile stations served by multiple base stations either on same or different IP subnet.
- (c) no signaling at or above the IP layer is required.
- (d) a mobile station does not have to use an additional IP address.
- (e) no modification to the mobile station is required. Base stations maintain the necessary table, cache the shadow addresses, and perform extra techniques for handoff.
- (f) the smooth handoff technique scales well for large networks.

4.1 Smooth Handoff within a Subnet

Base stations perform the algorithms in Sections 1.1, 1.3 and 1.5 to assign and insert a shadow address in the Watch Lists for the mobile station. Base stations then respond to an ARP REQUEST when there is an IP packet destined to the mobile station. Since the base stations involving in the smooth handoff have the same shadow address for the mobile station, the mobile station will receive the IP packets from at least one base station. Therefore smooth handoff can be achieved. The entry of the mobile station in the old base station will be deleted once the handoff is done. The mobile station then will receive packets only from one base station.

4.2 Smooth Handoff Across Subnets

For handoff across different subnets, base stations again perform the same algorithms in Sections 1.1, 1.3 and 1.5. The shadow addresses used by the same mobile station in cells belonging to different IP subnets may be the same or different. Depending on specific IP-layer mobility management methods, IP packets may be sent to a single or multiple base stations. In particular, if soft handoff in the IP layer is deployed, IP packets will be sent to multiple base stations. Smooth handoff can be achieved using the same method described in the Section 4.1. If soft handoff is not deployed in the IP layer, the IP packets will be destined to only one base station (i.e., either the new or the old base station). Either the new or the old base station will be able to correctly respond to the ARP REQUEST from any other network device (e.g., an IP router or another iBS) that wants to send IP packets to it. This is because either one of the base stations will already have the mobile station's shadow address in its Watch List. Therefore, the IP packets can reach the mobile station from either one of the base stations. Base stations do not need to do any extra signaling with other base stations in either the link- or the network-layer for carrying out handoff. Furthermore, only one handoff is needed when mobile station moves across IP subnets. Thus, smooth handoff is achieved easily in both link- and network-layers.

Also, by way of reiteration, each time when the mobile station moves to a new subnet, it must acquire a private or public IP address from a server (e.g. DHCP server or Foreign Agent) for that specific subnet. This is part of the registration and configuration. Which IP address the CH should use to reach the mobile station depends on how location update is performed. If basic Mobile IPv4 is employed, for example, CH always uses the home address of the mobile station. The normal Home Agent process directs a packet to old (or home) IP address before handoff, that is, registration of new IP address with the Home Agent is delayed until soft handoff is completed.

In some cases, the mobile station may perform smooth handoff with multiple base stations. Not all of these cells may be on the same IP subnet. The algorithms still apply in this case and smooth handoff can be achieved as well.

Although the present invention have been shown and described in detail herein, those skilled in the art can readily devise many other varied embodiments that still incorporate these teachings. Thus, the previous description merely illustrates the principles of the invention. It will thus be appreciated that those with ordinary skill in the art will be able to devise various arrangements which, although not explicitly described or shown herein, embody principles of the invention and are included within its spirit and scope. Furthermore, all examples and conditional language recited herein are principally intended expressly to be only for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, that is, any elements developed that perform the function, regardless of structure.

In addition, it will be appreciated by those with ordinary skill in the art that the block diagrams herein represent conceptual views of illustrative circuitry embodying the principles of the invention.

What is claimed is:

1. A method for carrying out soft handoff of a mobile station from a first base station served by a first wireline subnet to a second base station served by a second wireline subnet, wherein each subnet has a link layer different than the link layer of the wireless network serving the mobile station, the mobile station has initially a first IP address compatible with the first wireline subnet, and each base station has a wireline link layer address, and wherein the first base station is served by a nearest router, the method comprising
   assigning by the first base station a shadow address for the mobile station, the shadow address corresponding to the mobile station, having a format compatible with the link layer of the first wireline subnet, and being distinct from said base station layer addresses and said mobile station first IP address.
   storing the first IP address and the shadow address in the nearest router,
   assigning a second IP address in the mobile station compatible with the second wireless subnet,
   communicating the second IP address from the mobile station to the nearest router via the first base station, and
   transmitting a frame containing a packet as conveyed by a sending device from the nearest router over the first wireline subnet to the first base station as determined by the shadow address and over the second wireline subnet to the second base station based upon the second IP address.

2. The method as recited in claim 1 further including communicating the shadow address from the first base station to the sending device in response to an address resolution request by the sending device.

3. The method as recited in claim 1 further comprising, after the transmitting, concurrently sending the packet from both the first base station and the second base station to the mobile station using a link layer frame compatible with the link layer of the wireless network.

4. The method as recited in claim 1 wherein the storing includes storing the first IP address and the shadow address for the mobile station as entries in a watch list in the first base station.

5. The method as recited in claim 1 further comprising, prior to communicating, sending the shadow address from the first base station to the mobile station and storing the shadow address in the mobile station.

6. A method for carrying out soft handoff of a mobile station from a first base station served by a first wireless subnet to a second base station served by a second wireline subnet, wherein each subnet has a link layer different than the link layer of the wireless network serving the mobile station, and the mobile station has initially a first IP address compatible with the first wireless subnet, and each base station has a wireline link layer address, the method comprising
   assigning a shadow address to the mobile station, the shadow address corresponding to the mobile station, having a format compatible with the link layer of the first wireline subnet, and being distinct from said base station layer addresses and said mobile station first IP address,
   identifying a nearest router serving the first base station,
   storing the first IP address and the shadow address of the mobile station in the nearest router,
   assigning a second IP address to the mobile station compatible with the second wireless subnet,
   communicating the second IP address from the mobile station to the nearest router via the first base station, and
   transmitting a frame containing a packet as conveyed by a sending device from the nearest router over the first wireline subnet to the first base station as determined by the shadow address from the first base station to the sending device in response to an address resolution request by the sending device.

7. The method as recited in claim 6 further including communicating the shadow address from the first base station to the sending device in response to an address resolution request by the sending device.

8. The method as recited in claim 6 further comprising, after the transmitting, concurrently sending the packet from both the first base station and the second base station to the mobile station using a link layer frame compatible with the link layer of the wireless network.

9. A method for carrying out IP layer soft handoff of a mobile station from a first base station served by a first wireline subnet to a second base station served by a second wireline subnet, wherein each subnet has a link layer different than the link layer of the wireless network serving the mobile station, the mobile station has initially a first IP address compatible with the first wireless subnet, and each base station has a wireline link layer address, the method comprising
   identifying a nearest router serving the first base station,
   assigning a shadow address to the mobile station by the first base station, the shadow address having the same format as the link layer address of the first wireline subnet and being distinct from said base station layer addresses and said first IP address of said mobile station,
   storing the shadow address and the first IP address in the nearest router,
   associating the mobile station with the second base station including the assignment of a second IP address to the mobile station, communicating the second IP address from the mobile station to the nearest router via the first base station for storage, transmitting a frame containing a packet as conveyed by a sending device from the nearest router over the first wireline subnet to the first base station as determined the shadow address and over the second wireline subnet to the second base station based on the second IP address, and propagating the packet from the first base station to the mobile station using the IP layer of the wireless network, and concurrently propagating the packet from the second base station using the IP layer of the wireless network.

10. The method as recited in claim 9 wherein the sending device sends an address resolution request including the first IP layer address of the mobile station and further including looking up the shadow address corresponding to the first IP layer address as stored in the nearest router and sending the shadow address in response to the address resolution request.

11. The method as recited in claim 9 wherein the step of propagating the packet from the first base station includes removing the packet from the wireline frame, passing the packet to the IP layer of the first base station, encapsulating the packet as a link layer wireless frame, and propagating the link layer wireless frame over a radio channel coupling the first base station with the mobile station.

12. The method as recited in claim 9 wherein the step of propagating the packet from the second base station includes removing the packet from the wireline frame, passing the packet to the IP layer of the second base station, encapsulating the packet as a link layer wireless frame and propagating the link layer wireless frame over a radio channel coupling the second base station with the mobile station.

13. The method as recited in claim 9 wherein the step of propagating the packet from the first base station includes removing the packet from the wireline frame, passing the packet to the IP layer of the first base station, encapsulating the packet as a link layer wireless frame, and propagating the link layer wireless frame over a radio channel coupling the first base station with the mobile station, and wherein the step of propagating the packet from the second base station includes removing the packet from the wireline frame, passing the packet to the IP layer of the second base station, encapsulating the packet as a link layer wireless frame, and propagating the link layer wireless frame over a radio channel coupling the second base station with the mobile station.

14. A system for carrying out soft handoff of a mobile station from a first base station served by a first wireline subnet to a second base station served by a second wireline subnet, wherein each subnet has a link layer different from the link layer of the wireless network serving the mobile station, wherein the mobile station has initially a first IP address compatible with the first wireline subnet, wherein the first base station is served by a nearest router, and wherein each base station has a link layer wireline address, the system comprising a storage device for storing the first IP address and a shadow address in the nearest router, the shadow address corresponding to the mobile station, having a format compatible with the link layer of the first wireline subnet being distinct from said base station link layer addresses and said mobile station first IP address, and being assigned by the first base station, a processor for assigning a second IP address to the mobile station compatible with the second wireline subnet, a sending device for communicating the second IP address to the nearest router via the first base station, and a transmitter for transmitting a frame containing the packet as conveyed by the sending device from the nearest router over the first wireline subnet to the first base station as determined by the shadow address and over the second wireline subnet to the second base station based upon the second IP address.

* * * * *

UNITED STATES PATENT AND TRADEMARK OFFICE
CERTIFICATE OF CORRECTION

PATENT NO. : 7,039,028 B2
APPLICATION NO. : 09/975912
DATED : May 2, 2006
INVENTOR(S) : Chen et al.

Page 1 of 2

It is certified that error appears in the above-identified patent and that said Letters Patent is hereby corrected as shown below:

On the Title Page, Item (57), under "ABSTRACT", in Column 2, Line 9, delete "it the to" and insert -- it to the --, therefor.

In the Drawings

In Fig. 9, Sheet 9 of 17, delete "  " and insert -- 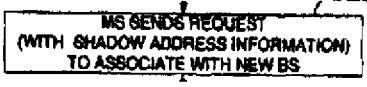 --, therefor.

In the Specification

In Column 6, Line 22, delete "station" and insert -- station. --, therefor.

In Column 18, Line 12, delete "pakcet." and insert -- packet. --, therefor.

In Column 19, Line 4, delete "WP" and insert -- IP --, therefor.

In Column 19, Line 7, delete "iB Ss" and insert -- iBSs --, therefor.

In Column 20, Line 17, delete "length" and insert -- length. --, therefor.

Signed and Sealed this
Eighteenth Day of November, 2014

Michelle K. Lee
*Deputy Director of the United States Patent and Trademark Office*

CERTIFICATE OF CORRECTION (continued)
U.S. Pat. No. 7,039,028 B2

In the Claims

In Column 23, Line 44, in Claim 1, delete "address." and insert -- address, --, therefor.

In Column 23, Line 64, in Claim 3, delete "transmitting" and insert -- transmitting, --, therefor.

In Column 26, Line 24, in Claim 14, delete "subnet being" and insert -- subnet, being --, therefor.